United States Patent [19]

Davenport D'Ingianni et al.

[11] Patent Number: 5,991,372
[45] Date of Patent: Nov. 23, 1999

[54] METHOD AND APPARATUS FOR FACILITATING FINANCIAL TRANSACTIONS WITHIN A COMMUNICATIONS SYSTEM

[75] Inventors: Rita Rae Davenport D'Ingianni, Richardson; Albert Giles Law, Jr., Plano, both of Tex.

[73] Assignee: Northern Telecom Limited, Montreal, Canada

[21] Appl. No.: 08/922,081

[22] Filed: Sep. 2, 1997

[51] Int. Cl.⁶ .................................................. H04M 11/00
[52] U.S. Cl. ...................................... 379/91.02; 379/93.12
[58] Field of Search ............................. 379/91.01, 91.02, 379/93.04, 93.12, 207, 218, 265, 266, 355, 357, 67.1

[56] References Cited

U.S. PATENT DOCUMENTS 3,920,908  11/1975  Kraus ..................................... 379/91.02
5,329,589  7/1994  Fraser et al. .......................... 379/91.02
5,745,554  4/1998  Rozetti .................................. 379/91.02
5,748,711  5/1998  Scherer ................................. 379/91.02

*Primary Examiner*—Wing F. Chan
*Attorney, Agent, or Firm*—Christopher O. Edwards; Daniel E. Venglarik; Andrew J. Dillon

[57] ABSTRACT

A method and apparatus in a communications system for facilitating a financial transaction between two parties within the communications system. The method of the present invention is implemented in a data processing system. A request for a financial transaction is received from the first party. A call is initiated by the data processing system to the second party associated with the request. The call is established between the first party and the second party wherein the financial transaction is established between the two parties through the call. Data is acquired from the two parties in response to the establishment of the financial transaction through the call. First party information and second party information is verified, wherein the financial transaction is securely completed.

38 Claims, 22 Drawing Sheets

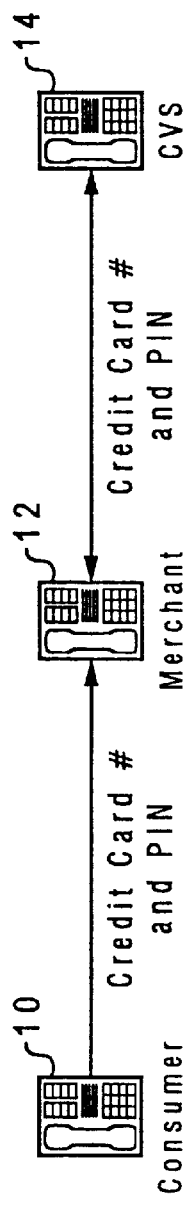
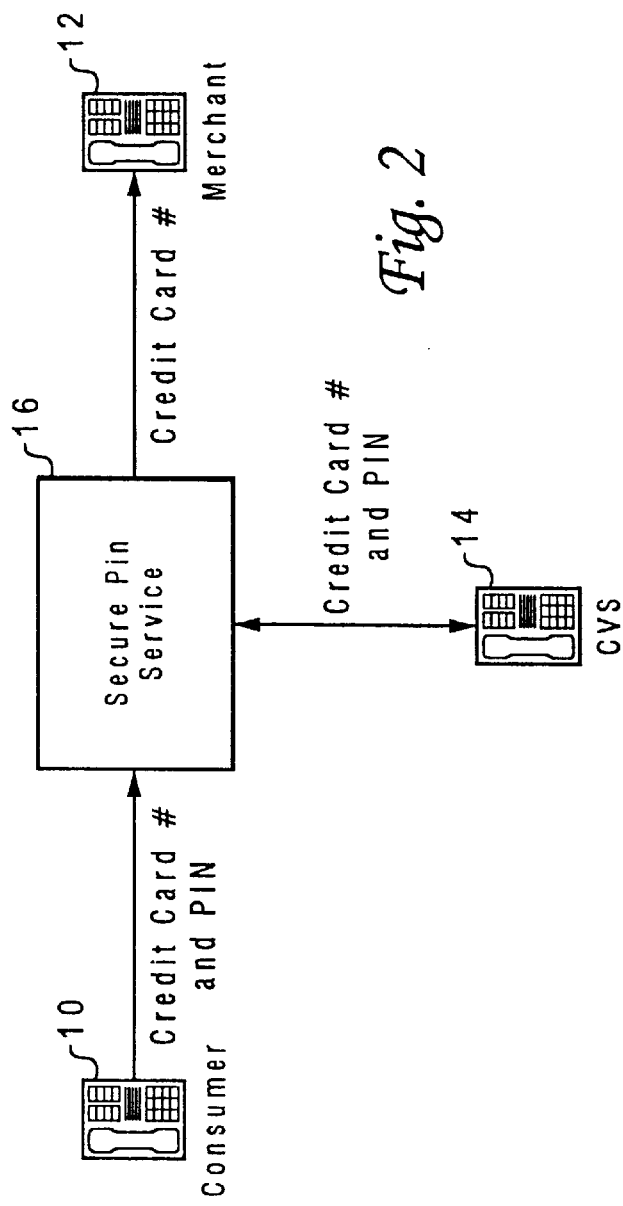

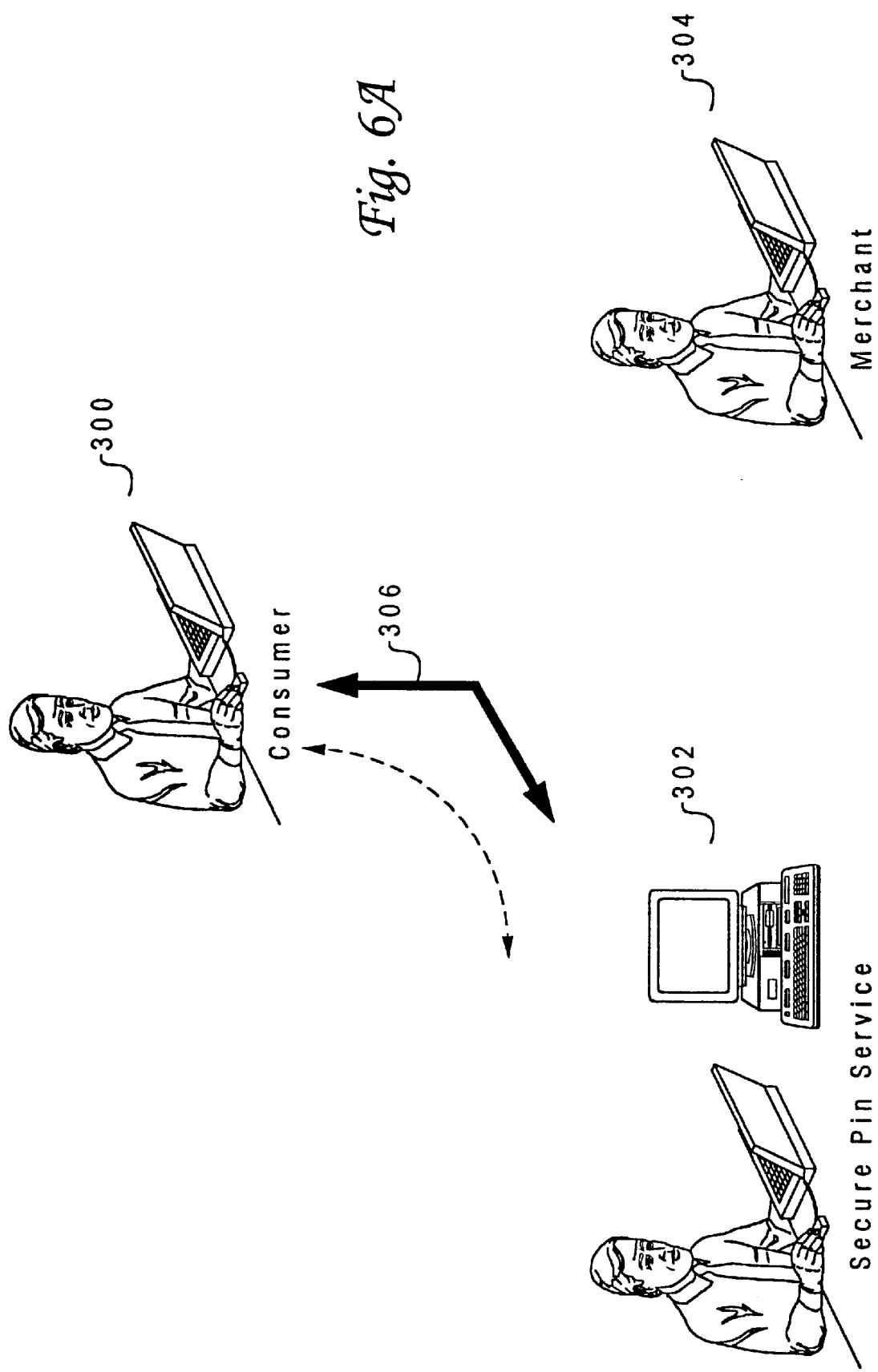

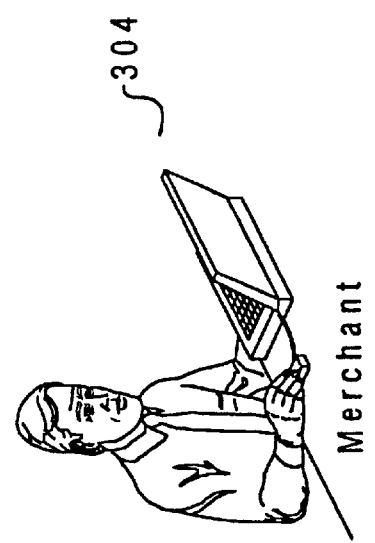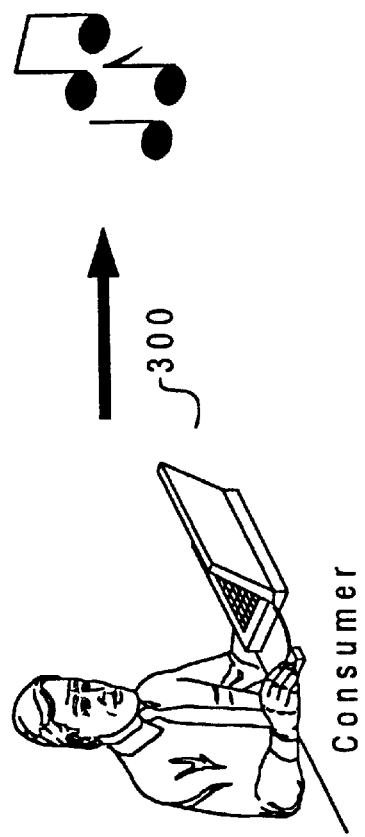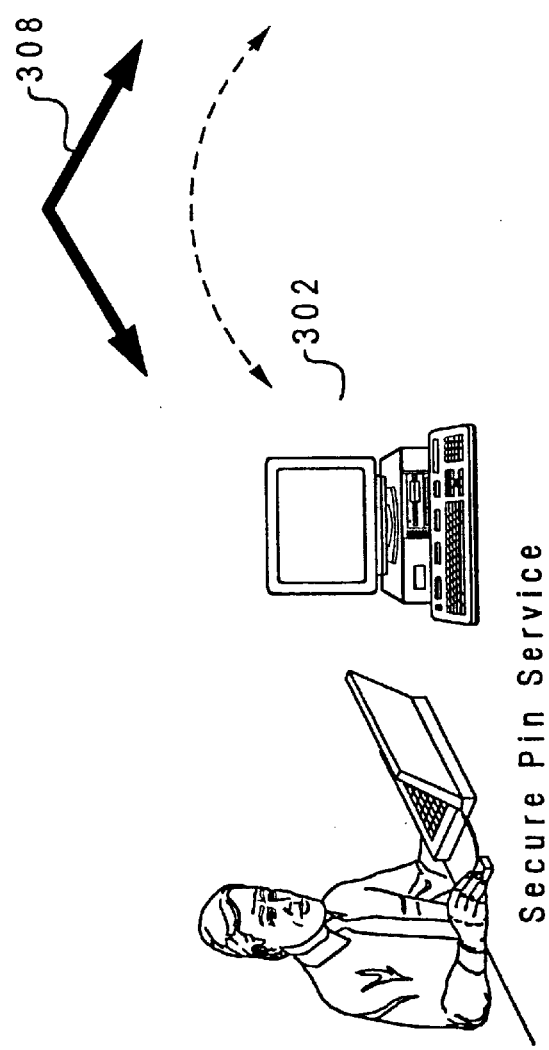
Fig. 6B

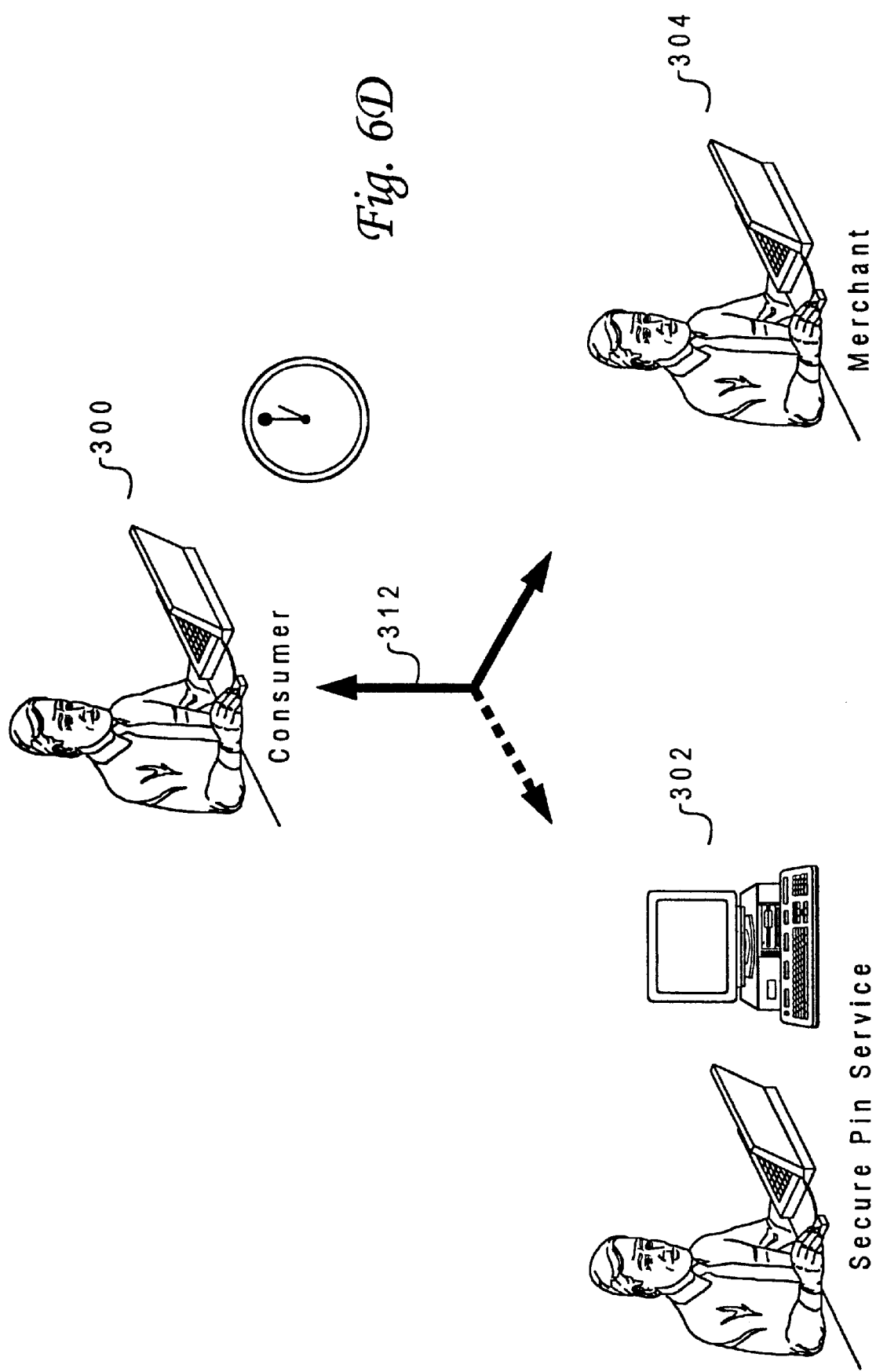

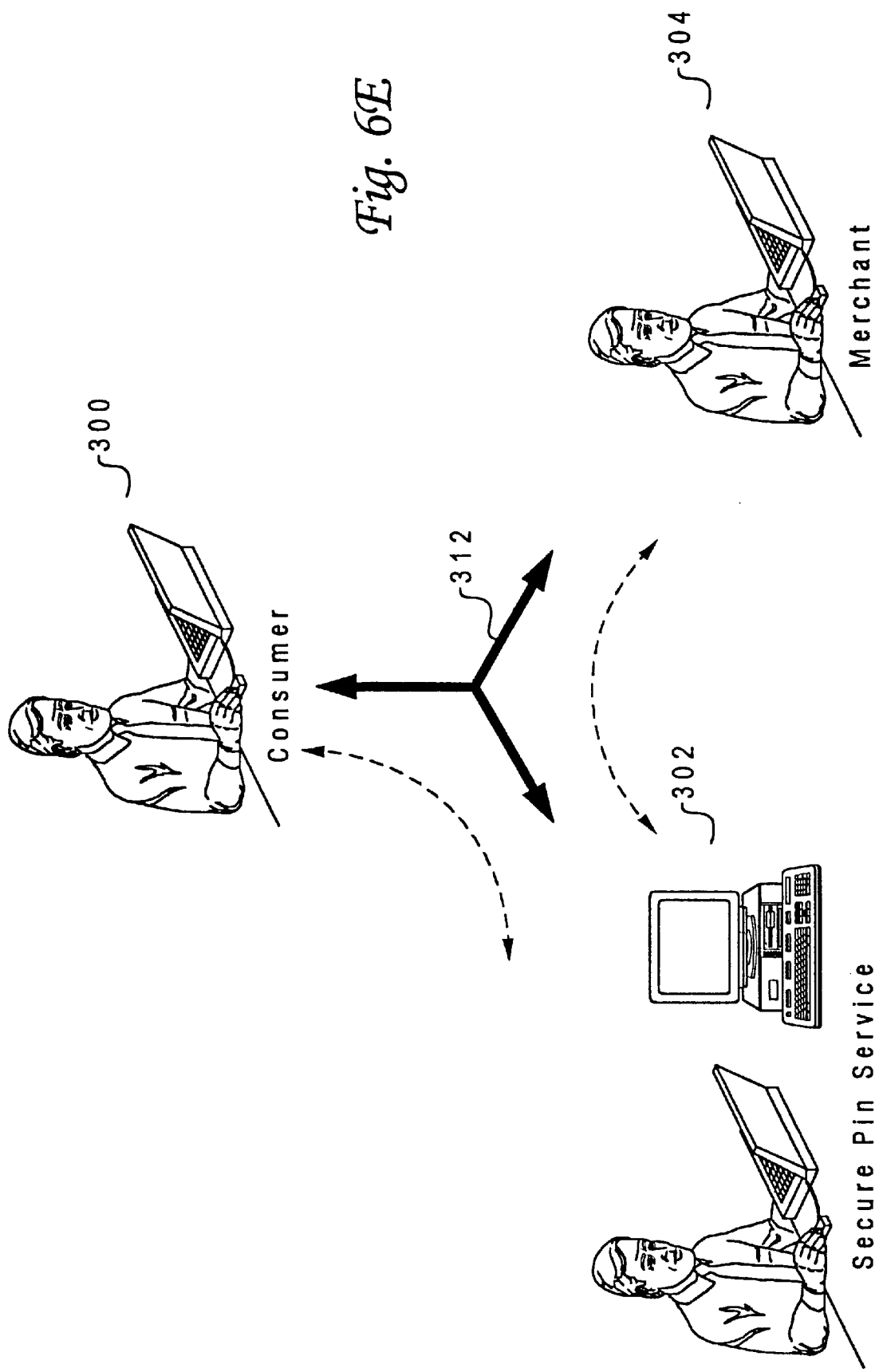

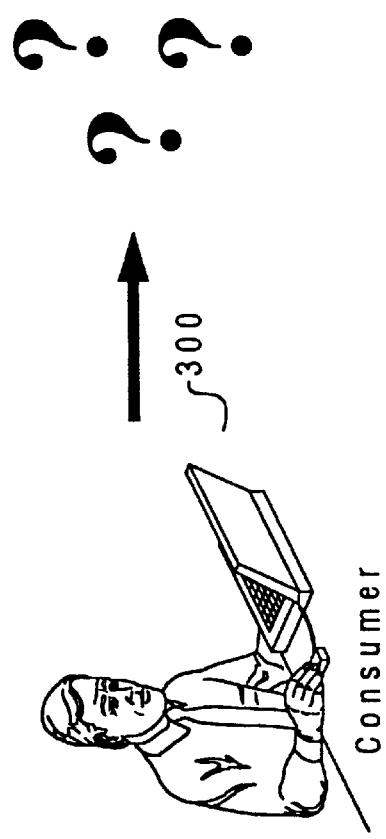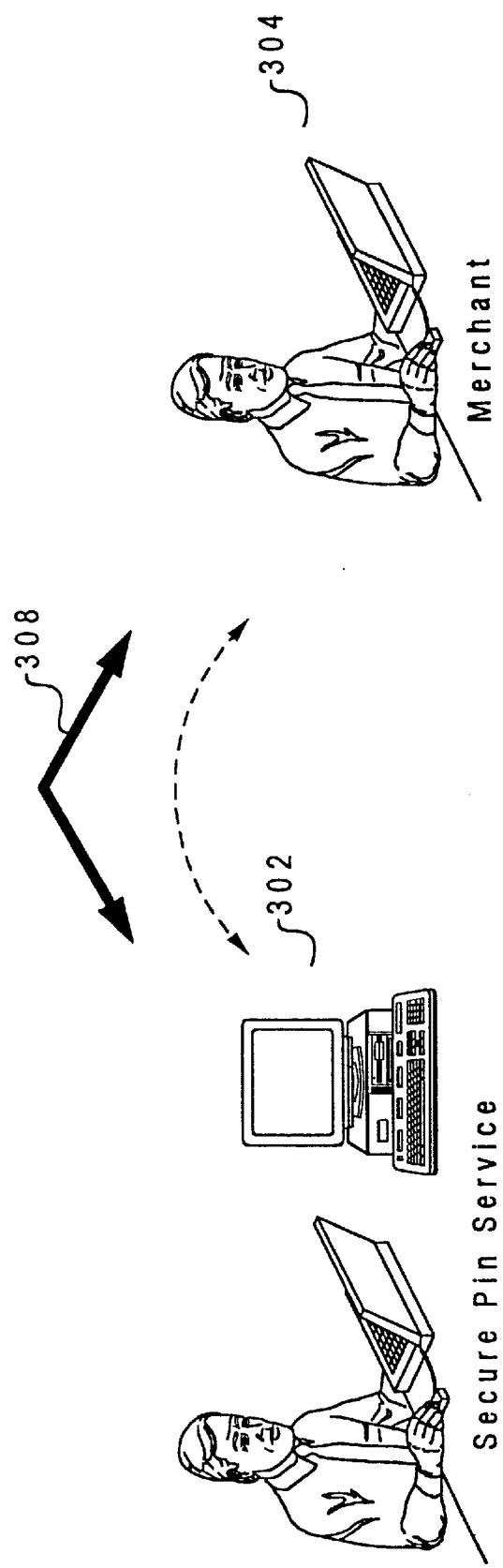
Fig. 6G

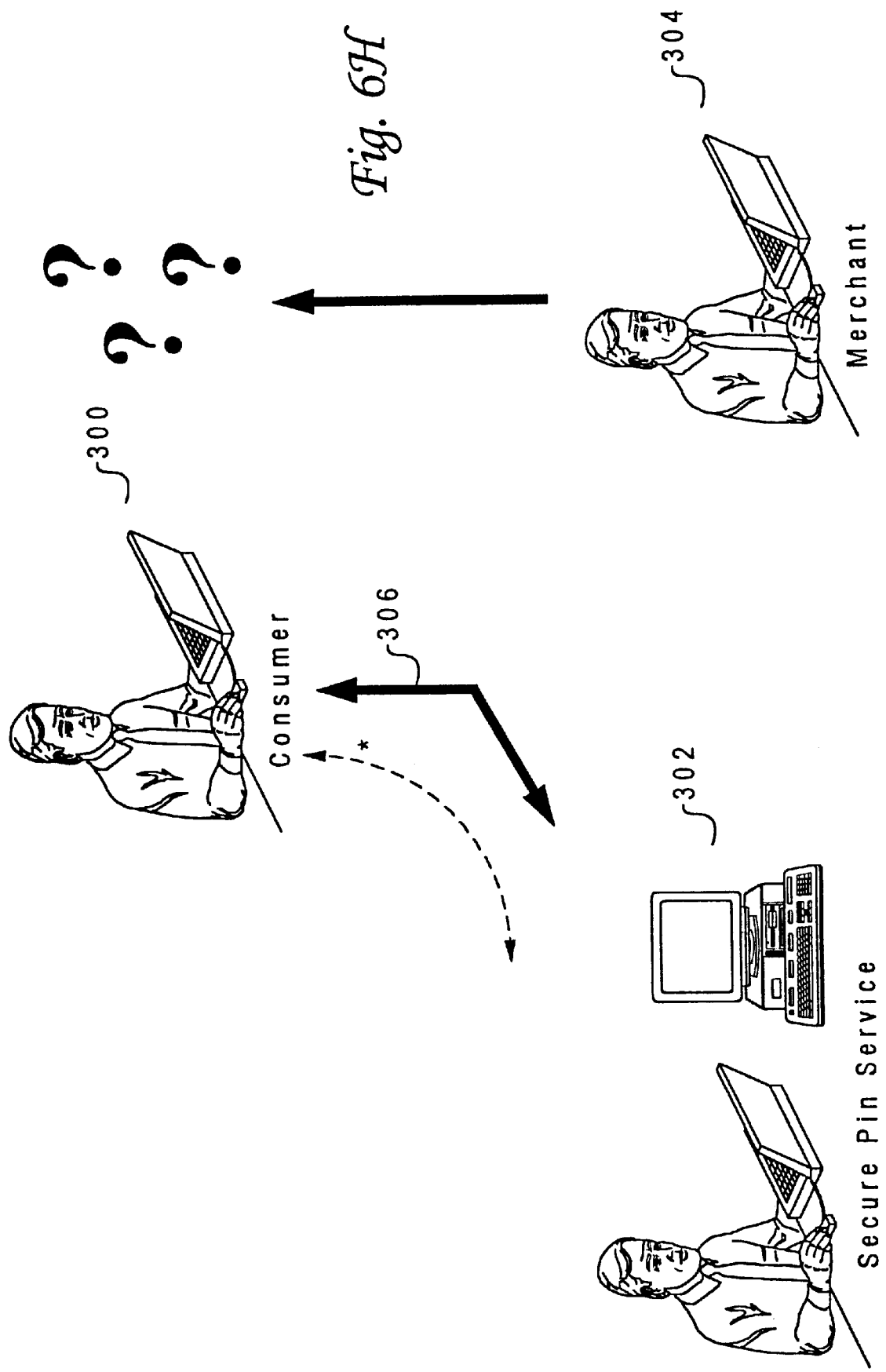

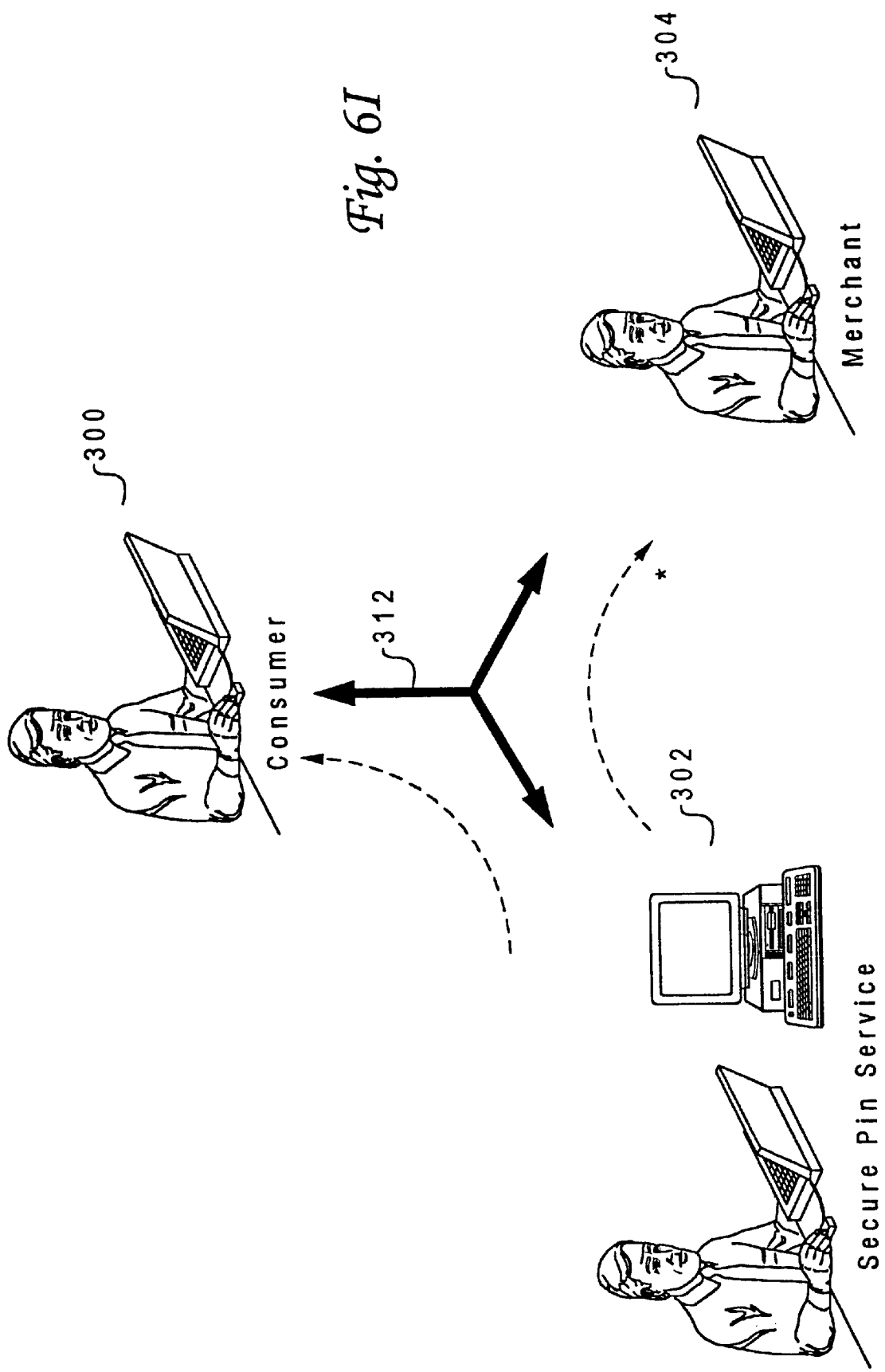

METHOD AND APPARATUS FOR FACILITATING FINANCIAL TRANSACTIONS WITHIN A COMMUNICATIONS SYSTEM

BACKGROUND OF THE INVENTION

1. Technical Field

The present invention relates generally to an improved communications system and in particular, to an improved method and apparatus for facilitating financial transactions within a communications system. Still more particularly, the present invention provides an improved method and apparatus for completing financial transactions involving credit cards.

2. Description of the Related Art

Recent advances in technology have resulted in unprecedented growth and diversification in the field of communications. Communications systems, long used for transmitting voice signals between telephones, are now being implemented in a wide variety of other applications. Such applications include, for example, the transfer of information between local area networks (LANs) and the transmission of documents via facsimile. The wide variety of available communications applications has resulted in a marked increase in the use of communications systems.

Communications system use has also increased as a result of the greater number of telephone devices now available. With the advent of devices such as portable and cellular telephones, more people spend a greater amount of time in telephonic communication than in the past.

These factors have contributed to a general increase in the use of communications systems and, in particular, to an increase in the use of communications systems for sending long distance and international transmissions. The dramatic social and economic changes which the world has undergone in the past several years have also resulted in the increased use of long distance and international communications systems. The current socioeconomic climate of the world suggests that the number of long distance and international transmissions will continue to grow at an increased rate.

In particular, financial transactions made through communications systems have increased by large amounts. Specifically, consumers are able to purchase goods and services over the telephone using a credit card. With the increase in credit card sales, credit card fraud also has risen. When made in person, credit card transactions require a valid credit card number, expiration date, and a signature, matching the signature on the back of the credit card. Furthermore, some credit card providers have provided photo identification on the credit card itself to help ensure against fraudulent use for in person transactions. As with in person transactions, financial transactions, involving a credit card, conducted over the telephone require both a credit card number and an expiration date. Unlike in person transactions, credit card transactions made over the telephone do not require a signature. As a result, criminals who make fraudulent credit card transactions only need to give the credit card number and expiration date to a merchant, ask for next day delivery, and watch for the merchandise to arrive at an unsuspecting address. This type of theft is particular easy if the criminal knows that the merchant ships the merchandise to the billing address of the cardholder and the cardholder is not present at the billing address during delivery hours.

When a telephone transaction requires a personal identification number (PIN), the PIN is disclosed to the merchant so that the transaction can be completed. In FIG. 1, consumer 10 is in telephonic contact with merchant 12 and establishes a transaction for the purchase of goods or services from merchant 12. To validate the credit card number for consumer 10, merchant 12 is required to send the credit card number and a PIN to credit card validation service (CVS) 14, which determines whether the credit card number is valid for the transaction. Credit card validation service 14 will return an indication to merchant 12 as to whether the credit card number is valid. Upon receiving an indication, merchant 12 can complete the transaction with consumer 10. The use of a PIN allows for more security in credit card transactions made over the telephone. This security, however, is still limited because consumer 10 must provide the PIN to merchant 12. Under this process, a large number of merchants have access to the credit card number and PIN of consumer 10, increasing the chances of the credit card number and PIN being used for fraudulent purposes.

Therefore, it would be advantageous to have an improved method and apparatus for facilitating financial transactions involving credit cards without the weaknesses of the presently available systems.

SUMMARY OF THE INVENTION

The present invention provides a method in a communications system for facilitating a financial transaction between two parties within the communications system. The method of the present invention is implemented in a data processing system. A request for a financial transaction is received from the first party. A call is initiated by the data processing system to the second party associated with the request. The call is established between the first party and the second party and the financial transaction is established between the two parties through the call. Data is acquired from the two parties in response to the establishment of the financial transaction through the call. Information from the first party and information from the second party needed to complete the transaction is then verified, wherein the financial transaction is securely completed.

In verifying the first party and the second party information, a separate voice path is established for each party in obtaining the information needed to complete the transaction. In the case where the first party is a buyer purchasing goods and/or services with a credit card, the buyer typically provides a credit card number, a personal identification number, and an expiration date through a voice path to the data processing system that excludes the second party, the seller. At the same time, the seller provides vendor identification information to the data processing system through another voice path excluding the buyer. Verification information is provided to the parties if both buyer and seller information are verified to complete the transaction.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a diagram illustrating a credit card transaction;

FIG. 2 is a diagram illustrating a credit card transaction in accordance with a preferred embodiment of the present invention;

FIGS. 6A–6I are diagrams illustrating a process for secure pin service in accordance with a preferred embodiment of the present invention;

DETAILED DESCRIPTION

With reference now to the figures and in particular with reference to FIG. 2, a diagram illustrating a financial transaction employing a secure pin service is depicted in accordance with a preferred embodiment of the present invention. In contrast to the situation illustrated in FIG. 1, consumer 10 can complete a transaction with merchant 12 in a secure manner through the use of secure pin service 16. In the depicted example, secure pin service 16 is an automated system that receives data from consumer 10 through DTMF signals. The system is automated and does not require a human representative at secure pin service 16 to receive the credit card number and PIN from consumer 10 for validation. Of course, data may sent in other known ways, such as using voice recognition if secure pin service 16 employs a voice recognition feature. Secure pin service 16 in the depicted example is a trusted service that is designed to insure that credit card numbers and PINs received by it remain secure. According to the present invention, consumer 10 provides a credit card number and PIN to secure pin service 16 in which secure pin service 16 performs the necessary inquiries to validate the credit card number with credit card validation service 14. If the credit card number is validated, secure pin service 16 provides the credit card number to merchant 12 without the PIN. In this manner, the PIN belonging to consumer 10 remains secure because access to the PIN is limited by using secure pin service 16.

Figure 3:
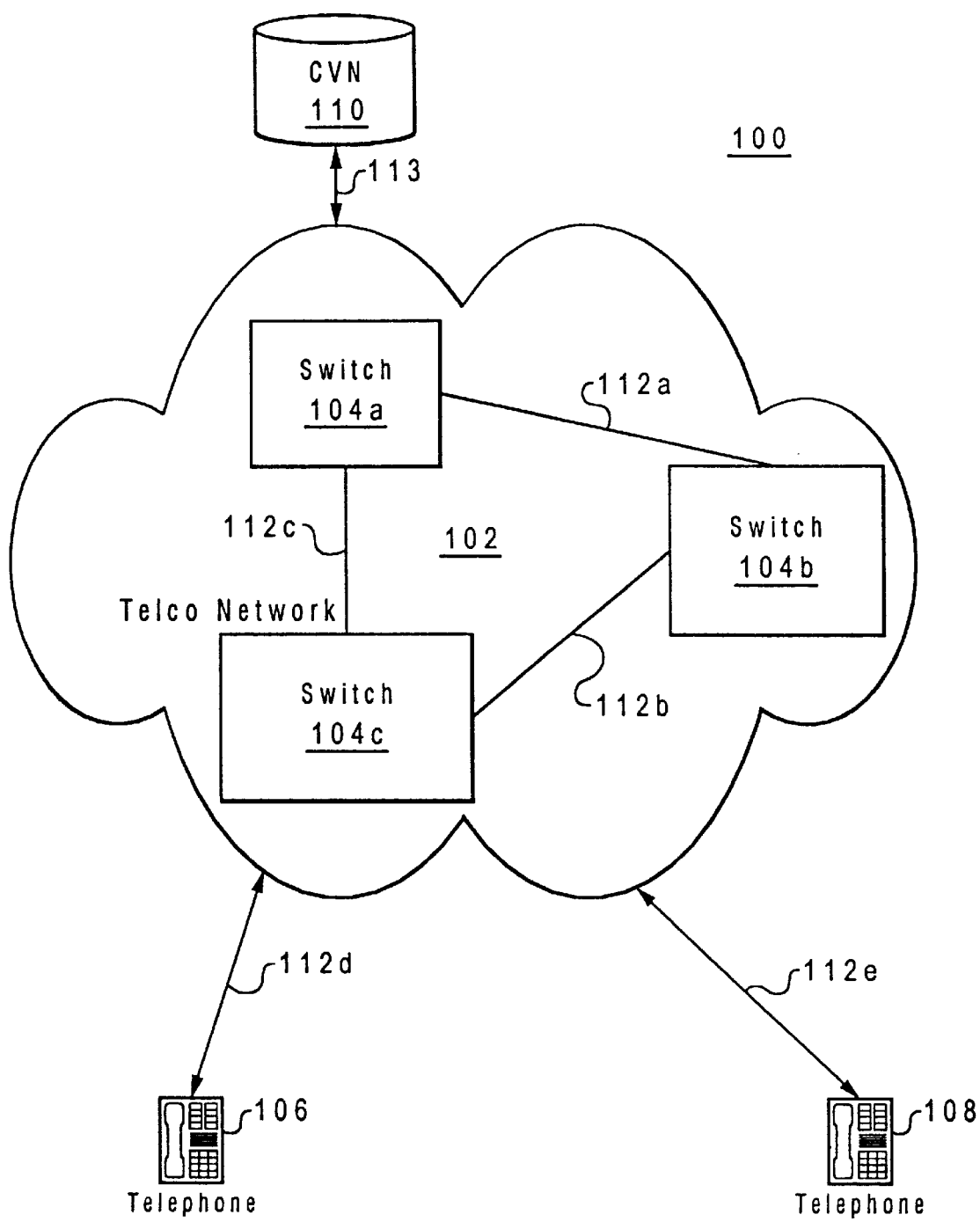
FIG. 3 is a diagram of a communications system in which a preferred embodiment of the present invention may be implemented.

Turning now to FIG. 3, a diagram of a communications system 100 is depicted in which a preferred embodiment of the present invention may be implemented. In particular, the present invention provides a method and apparatus for facilitating transactions between buyers and sellers of goods and/or services with the processes of the present invention being implemented within communications system 100.

Communications system 100 in FIG. 3 includes a telecommunications network 102, also called a "Telco Network". Telecommunications network 102 may be, for example, a local exchange carrier (LEC), a interexchange carrier (IEC), or a hybrid network. In the case that telecommunications network 102 is in the form of a hybrid network, such a network may include landline and/or wireless communications systems. In the case that a call involves long distance service, the IEC is the service provider for the call within telecommunications network 102. Telecommunications network 102 also includes a number of switches 104a–104c, which provides establishing and routing a call between source customer premises equipment (CPE) 106 and target CPE 108. Additionally, credit card validation node (CVN) 110 may be connected to telecommunications network 102 in which credit card validation node 110 may be, for example, a database or service that provides validation information for the secure pin service system of the present invention. Switches 104a–104c interconnect transmission facilities and are employed to route traffic throughout telecommunications network 102. Transmission facilities provide communications paths 112a–112c to carry a user's voice and network control information between switches in a network. Communications paths 112d and 112e connect CPE 106 and CPE 108 to a switch within telecommunications network 102. Credit card validation node 110 is connected to telecommunications network 102 by communications path 113. Generally, transmission facilities include a medium, such as, for example, air, copper wires, coaxial cables, or fiber optic cables, along with electronic equipment employed to amplify signals. CPE, also called station equipment, is generally located at a user's premises. The depicted example contains three switches and three communications paths for illustrative purposes only. Depending on the system, other numbers of switches, communications paths, and configurations thereof may be employed. The function of CPE is to transmit and receive user information and exchange control information with telecommunications network 102 to place calls and access services from telecommunications network 102. CPE may be, for example, a telephone, a computer, or a fax machine.

Figure 4:
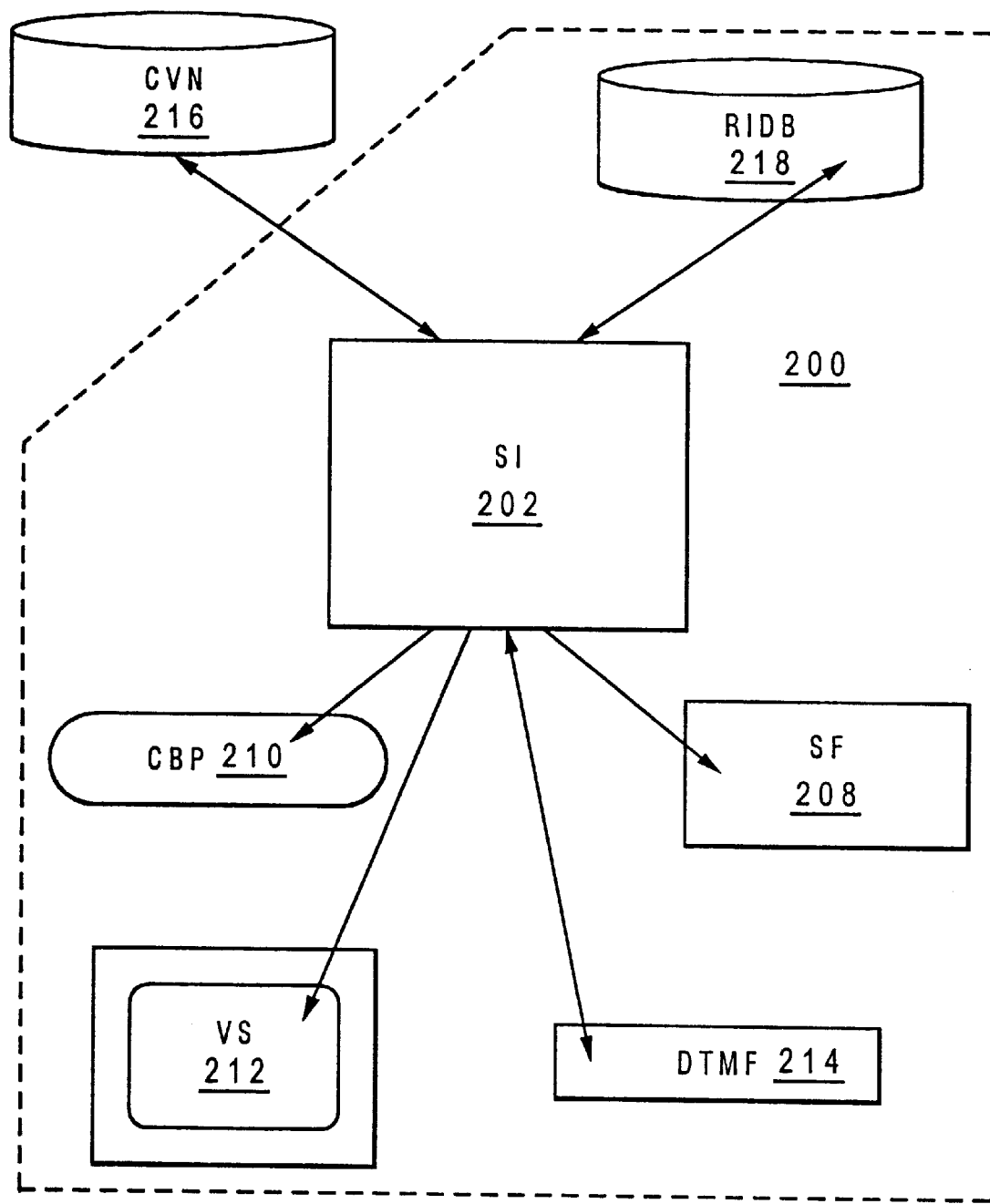
FIG. 4 is a functional block diagram of a data processing system in accordance with a preferred embodiment of the present invention.

The process of the present invention may be implemented in a data processing system within telecommunications network 102. For example, the data processing system may be implemented as a switch or as a computer having a connection to the switch. Turning now to FIG. 4, a functional block diagram of a data processing system 200 is depicted in accordance with a preferred embodiment of the present invention. Data processing system 200 is an example of a data processing system in which a preferred embodiment of the present invention may be implemented. In particular, data processing system 200 in FIG. 4 contains hardware that is depicted in functional units in accordance with a preferred embodiment of the present invention may be implemented. Some of the functional units described below for data processing system 200 may be configured in different physical units depending on the implementation. Examples of physical implementations are described below with reference to FIGS. 5A and 5B.

Still referring to FIG. 4, data processing system 200 contains switch intelligence (SI) 202, which provides the logic for call processing and secure pin service in accordance with the preferred embodiment of the present invention. In addition, data processing system 200 includes switch fabric 208, which contains the communications links and other switch hardware used to connect callers to the switch and to each other. Conference bridge pool (CBP) 210 within data processing system 200 provides the hardware and/or software functions required to provide conference call services. Voice server function (VS) 212 contains multiple independent voice channels or paths for sending messages. In the depicted example, each of the voice channels are referred to as voice ports. For example, voice server 212 may contain three voice ports identified as VP1, VP2, and VP3. Data processing system 200 also includes a DTMF detector 214 for detecting DTMF tones that may be transmitted by a user. Depending upon the implementation, voice recognition equipment may be used in place of or in addition to DTMF detector 214. Card validation node (CVN) 216 is an entity that validates the transaction, such as, for example, validating credit card and vendor information. Card validation node 216 could be, for example, a database containing credit card number, PIN number, and vendor identification. Alternatively, card validation node 216 is a service that provides validation of information sent to it. Routing information database (RIDB) 218 is a database containing routing information for call processing. In the depicted example, card validation node 216 is not contained within data processing system 200. Depending upon the implementation, card validation node 216 may be contained within a switch or data processing system.

The processes of the present invention are implemented in a switch, the present invention may be implemented in a data processing system. For example, the processes of the present invention may be implemented, for example in a switch, in an intelligent network, or within a computer having a connection to a switch in which the computer provides the logic and commands to the switch to provide the processes used to facilitate transactions between a buyer and a seller. The actual process for facilitating such a transaction is described in an example involving a consumer and a merchant in a transaction involving a credit card.

Figure 5A:
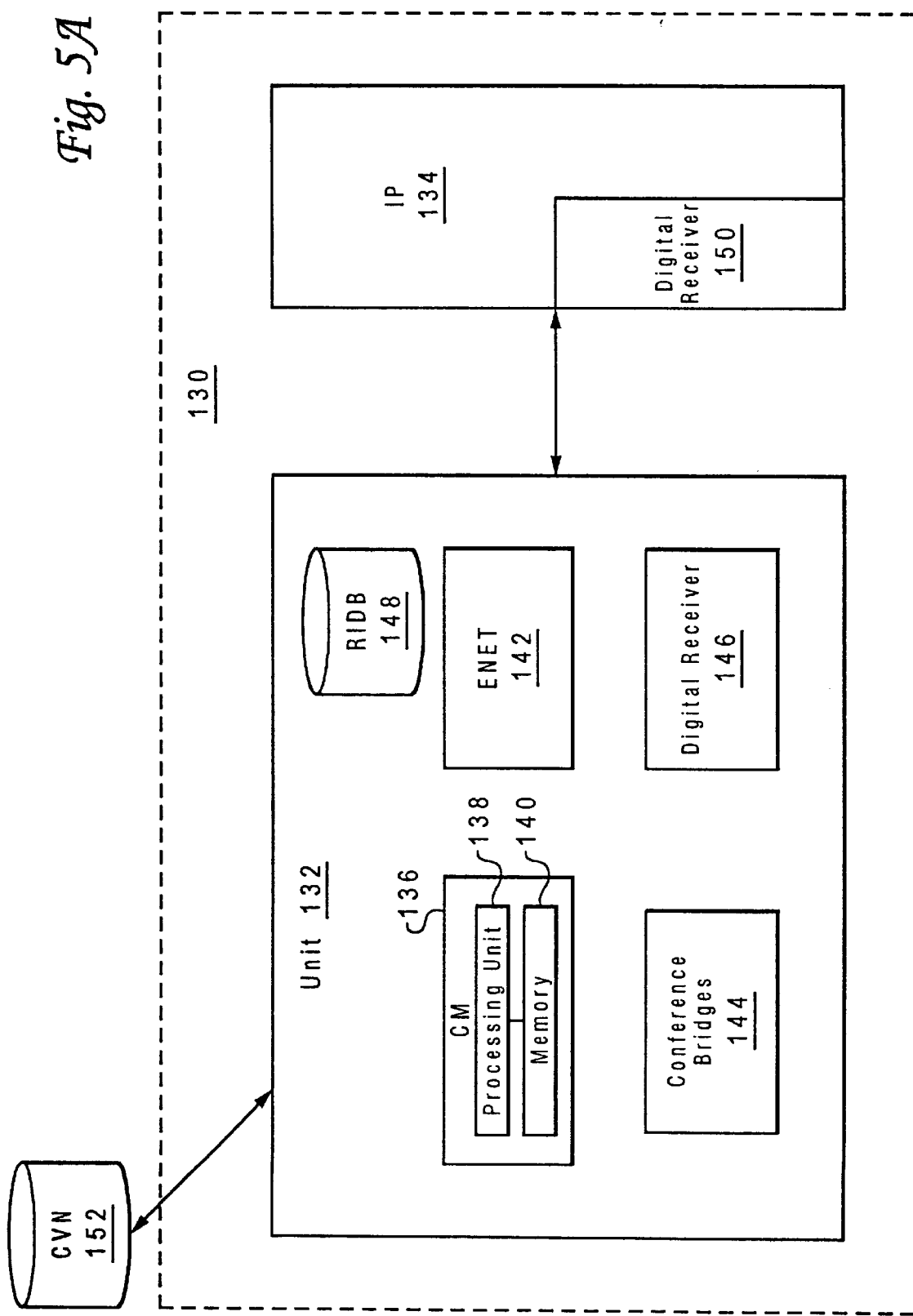
FIG. 5A is a block diagram of a switch in accordance with a preferred embodiment of the present invention.

Turning now to FIG. 5A, a physical block diagram of a switch 130 is depicted in accordance with a preferred embodiment of the present invention. Switch 130 is representative of the DMS family of switch products available from Northern Telecom in Ottawa, Canada. Switch 130 in FIG. 5A may be implemented within communications system 100 in FIG. 3, such as switches 104a, 104b or 104c. In FIG. 5A, switch 130 includes unit 132 connected to intelligent peripheral 134. Unit 132 contains a computing module (CM) 136, which provides switch intelligent functions for switch 130. Computing module 136 contains processing unit 138 and a memory 140. Processing unit 138 may contain, for example, one or more microprocessors for executing instructions to provide logic for call processing and secure pin service in accordance with the preferred embodiment of the present invention. Memory 140 stores instructions and data and may include random access memory (RAM) and/or read only memory (ROM).

Unit 132 also includes enhanced network (ENET) 142, which provides a switch fabric function. Conference bridges 144 provides the conference bridge pool function illustrated in FIG. 4 while digital receiver 146 provides DTMF functions. Unit 132 also contains a routing information database 148 similar to RIDB 218 in FIG. 4. Voice server functions are provided by intelligent peripheral 134. Additionally, intelligent peripheral also contains a digital receiver 150. Digital receivers 146 and 150 may provide voice recognition functions in place of or in addition to recognizing DTMF tones. Switch 130 has a connection to a card validation node (CVN) 152, which is external to switch 130.

Figure 5B:
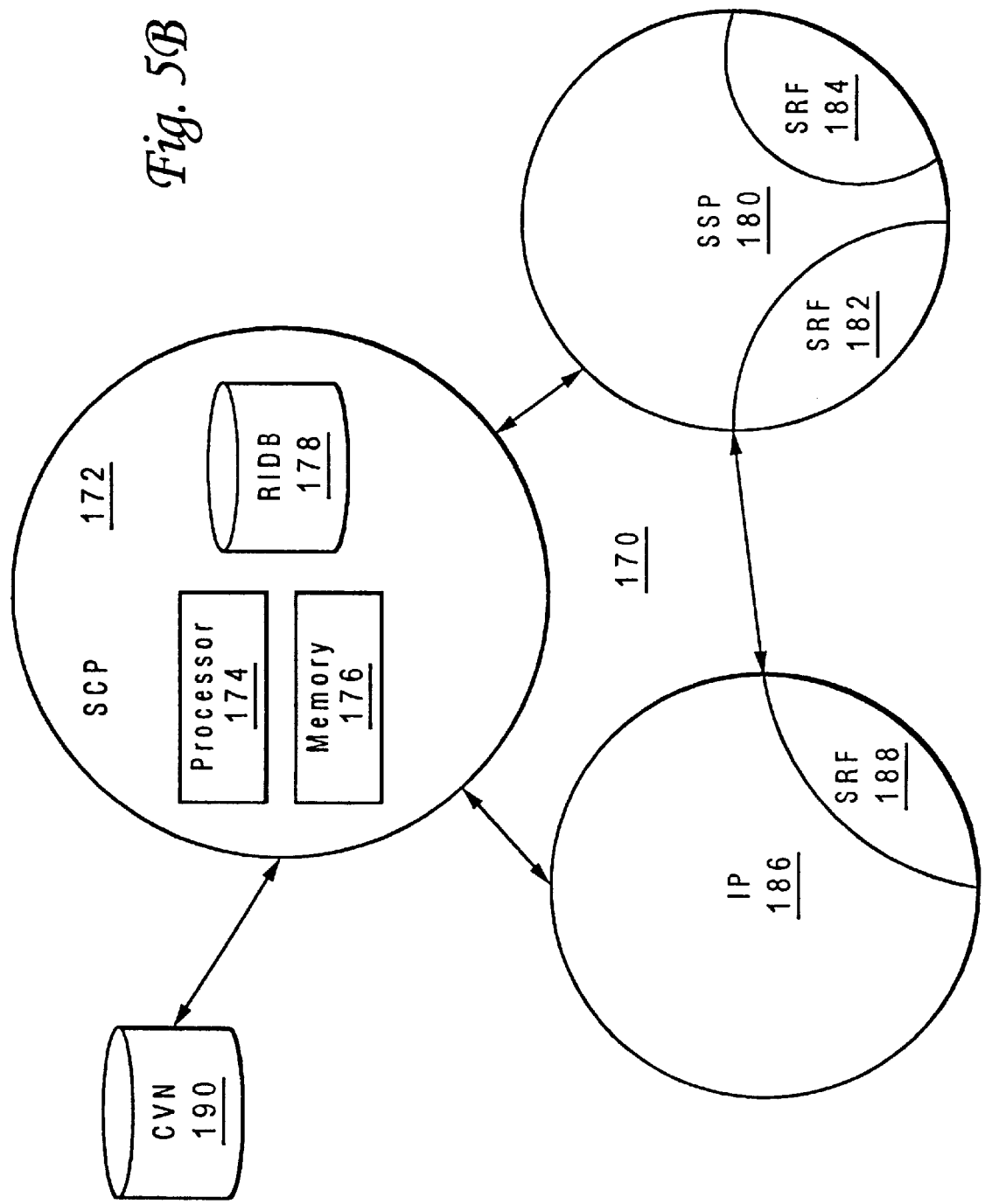
FIG. 5B is a block diagram of physical components in an intelligent network in accordance with a preferred embodiment of the present invention.

Turning now to FIG. 5B, a block diagram of physical components in an intelligent network (IN) 170 is depicted in accordance with a preferred embodiment of the present invention. Intelligent network 170 is representative of an International Telecommunications Union intelligent network defined by ITU-T Q.1200. Network 170 is the component that network 102 is comprised of in accordance with a preferred embodiment of the present invention. Intelligent network 170 includes a service control platform (SCP)172, which is the switch intelligence for intelligent network 170. Within service control platform 172 is a processor unit 174 and a memory 176, which contain the processing logic for providing the secure pin service in the depicted example. Additionally, service control platform 172 also contains a routing information database 178. Intelligent network 170 also contains a service switching platform (SSP) 180, which provides switch fabric functions. Specialized resource functions (SRFs) 182 and 184 are found within service switching platform 180. Specialized resource function (SRF) 182 provides DTMF functions for recognizing signals from consumer premises equipment while specialized resource function 184 is equivalent to a conference bridge pool. Intelligent peripheral (IP) 186 also is a part of intelligent network 170 and provides voice server functions. Additionally, within intelligent peripheral 186 is specialized resource function 188, which also serves to provide DTMF functions. Alternatively, instead of DTMF functions, specialized resource functions 182 and 188 may be employed to provide voice recognition in place of or in addition to recognizing DTMF tones. Service control platform 172 is in communication with card validation node 190, which is external to intelligent network 170 in the depicted example.

Turning now to FIGS. 6A–6I, diagrams illustrating a process for secure pin service is depicted in accordance with a preferred embodiment of the present invention. The secure pin service illustrated in these diagrams, depict a process for securely executing a financial transaction involving a credit card. The secure pin service in the depicted example is implemented as software within a data processing system, such as data processing system 200 in FIG. 4. The secure pin service does not require a human user to be present to facilitate a transaction between a consumer and a merchant.

In FIG. 6A, a consumer 300 activates secure pin service 302 by dialing a special number, such as an 800 number. By dialing the number, a communications link 306 is established between consumer 300 and secure pin service 302. Consumer 300 is prompted by secure pin service 302 for a merchant number for a merchant 304 from which consumer 300 desires to purchase goods or services. The prompt by secure pin service 302 in the depicted example is a voice message played to consumer 300, such as, for example, "Welcome to the Secure Pin Service. Please enter the telephone number of the merchant for whom you would like to make a sales transaction." In response to consumer 300 entering a phone number for merchant 304, secure pin service 302 sends an automated message to consumer 300 for a momentary separation from the call between secure pin service 302 and consumer 300. For example, secure pin service 302 could send the following message to consumer 300: "Please hold while your merchant is being contacted."

Then, in FIG. 6B, secure pin service 302 initiates a call to merchant 304 to establish a communications link 308 between secure pin service 302 and merchant 304. As the call is being made to merchant 304 by secure pin service 302, consumer 300 is connected to music on hold by secure pin service 302. In response to merchant 304 answering the call, communications link 308 is established and secure pin service 302 sends an automated message to merchant 304, such as, for example, "Welcome to the Secure Pin Service. Your customer will now be connected to make a sales transaction."

Figure 6C:
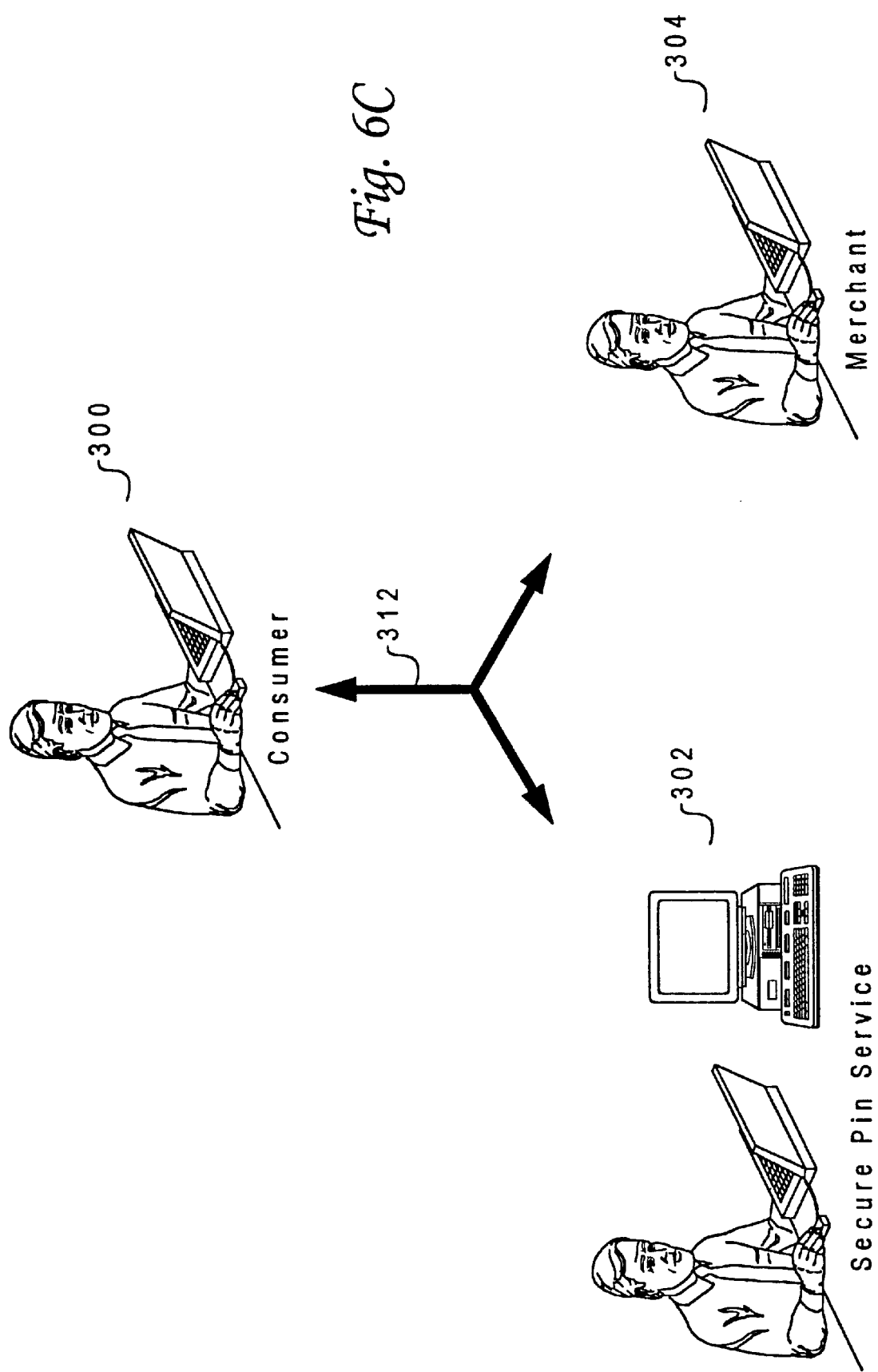

Turning now to FIG. 6C, secure pin service 302 connects consumer 300 and merchant 304 by combining communications links 306 and 308 to form a communications link 312. Secure pin service 302 then sends an automated message stating that secure pin service 302 will monitor the call for an indication that a sales transaction has been established or completed. This indication causes secure pin service to continue to process the transaction between consumer 300 and merchant 304. The automated message may be, for example: "Please indicate by entering a '#' when the sales transaction has been established. The secure pin service will then complete the transaction." Although the "#" key is employed to indicate that the transaction has been established in this example, other keys may be employed to make such an indication. Additionally, a key word spoken by consumer 300 or merchant 304 may be used if voice recognition processing is present. In FIG. 6D, consumer 300 and merchant 304 establish the sales transaction, which may include, for example, sales items, total sales amounts, and shipping information. During this period of time, secure pin service 302 monitors the call for an indication to continue the service, such as the pressing of the "#" key. Secure pin service 302 may set a maximum allowable amount of time to establish the sales transaction. In FIG. 6E, once the sales transaction is established, consumer 300 notifies secure pin service 302 to continue the service by entering or depressing the "#" key. An automated message from secure pin service 302 prompts consumer 300 for the total amount of the sale. Such a message may be as follows: "Consumer please enter the total amount of sale followed by '#'". If the total amount of sale is $41.95, then consumer 300 enters: 4195#. In response, an automated message from secure pin service 302 is sent to verify the amount, such as, for example: "The total amount of your sales transaction is $41.95." Merchant 304 verifies this message by entering the "#" key.

Figure 6F:
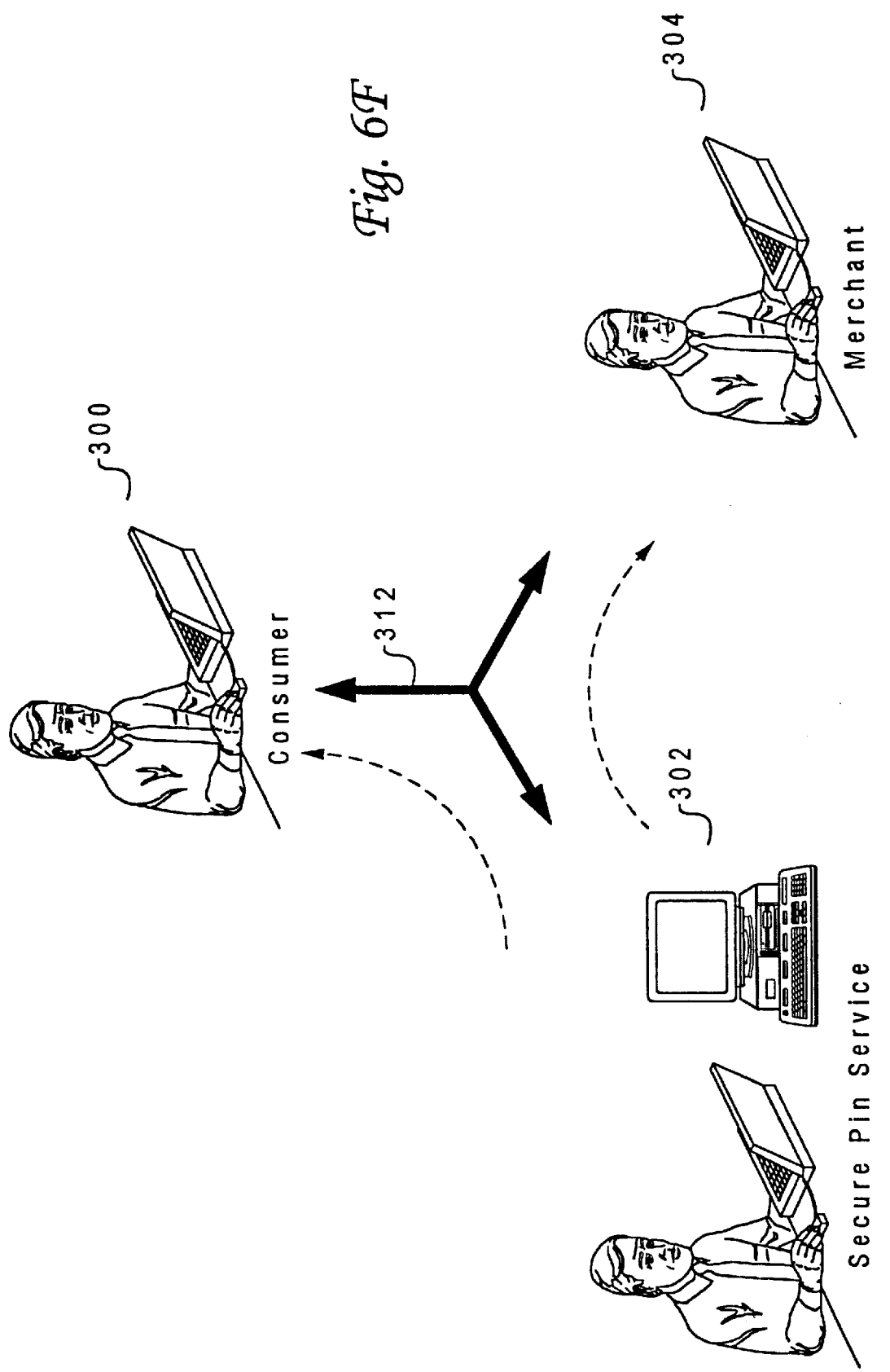
Figure 7A:
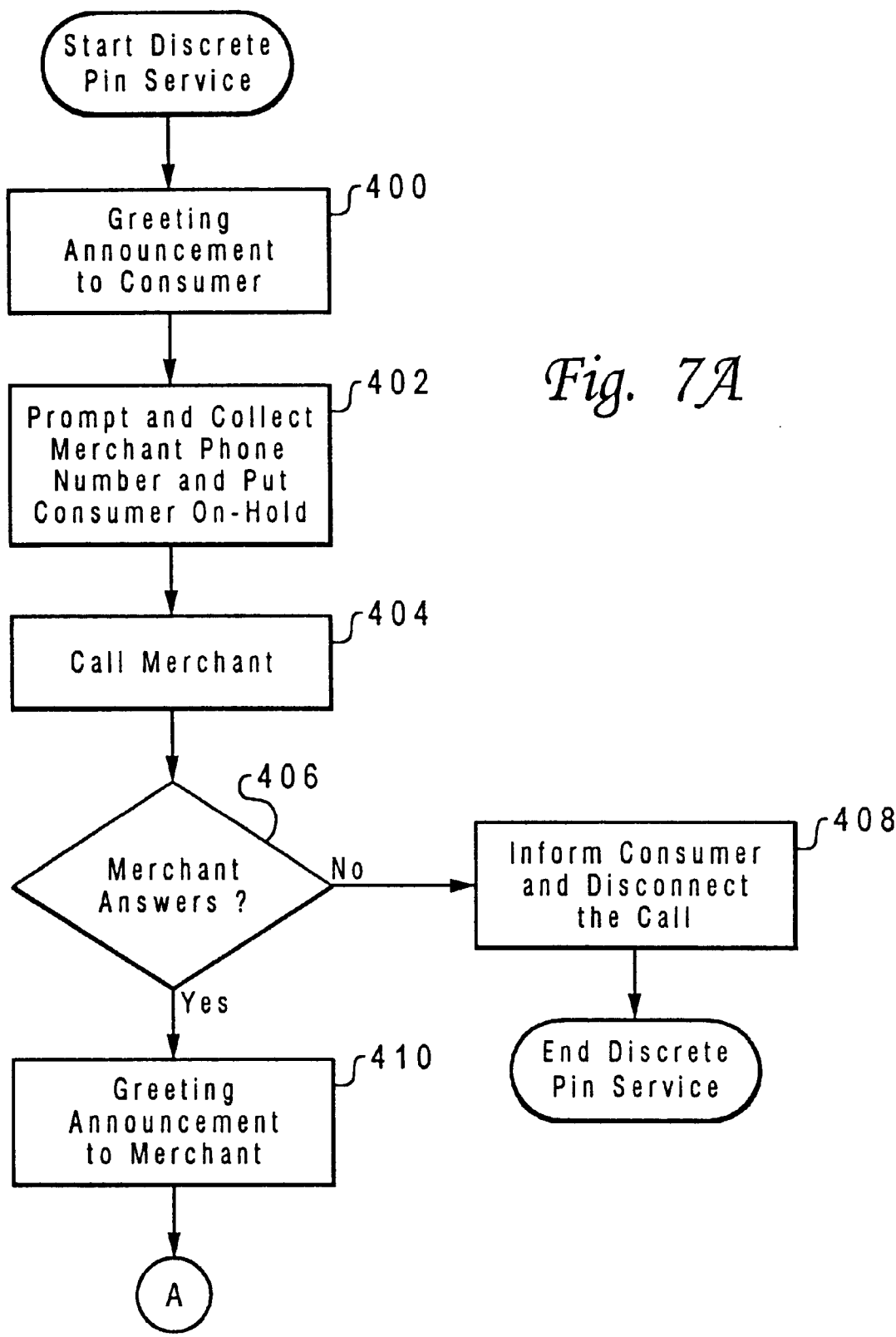
FIGS. 7A–7E are flowcharts of a secure pin service process in accordance with a preferred embodiment of the present invention.
Figure 7B:
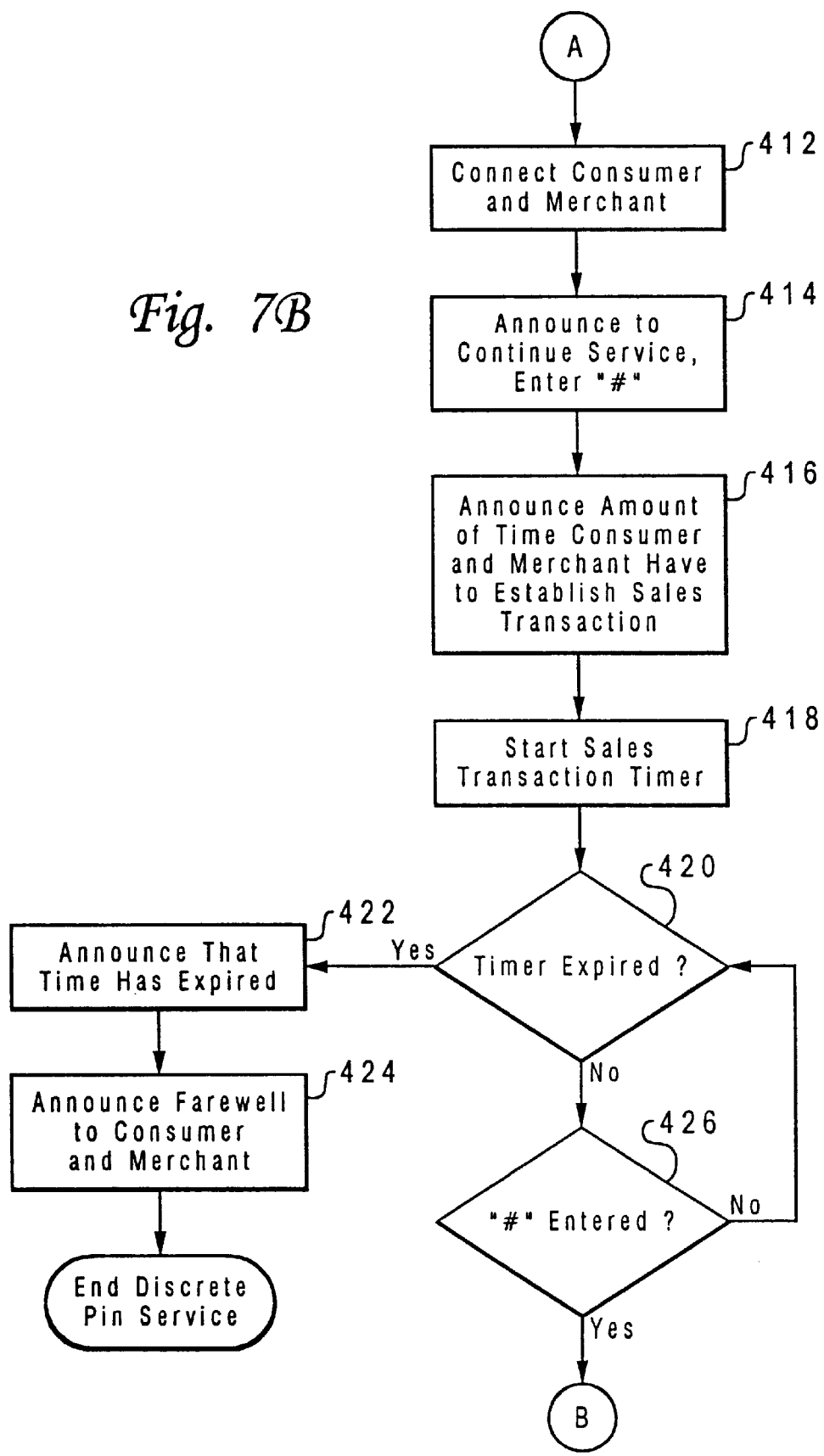
Figure 7C:
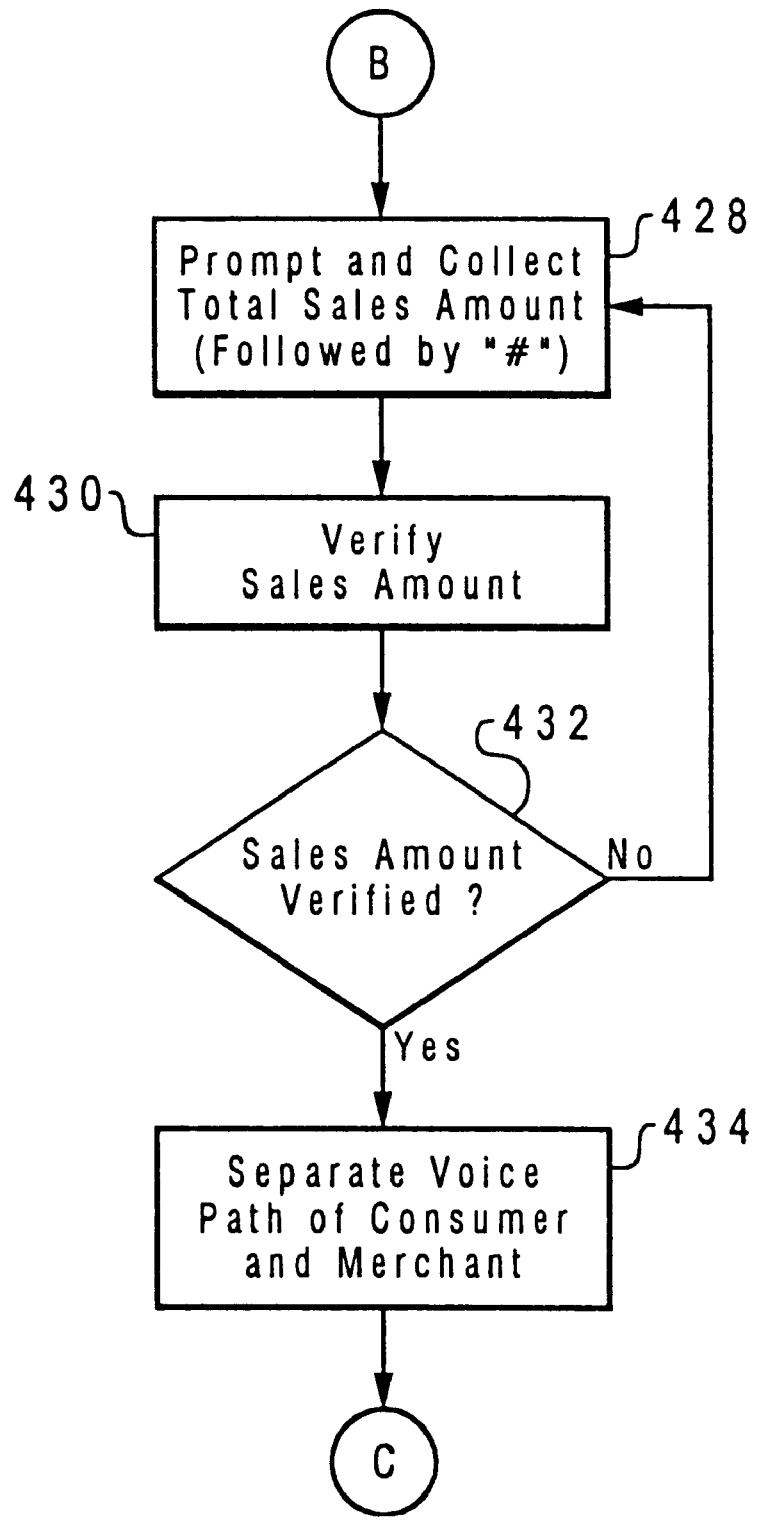
Figure 7D:
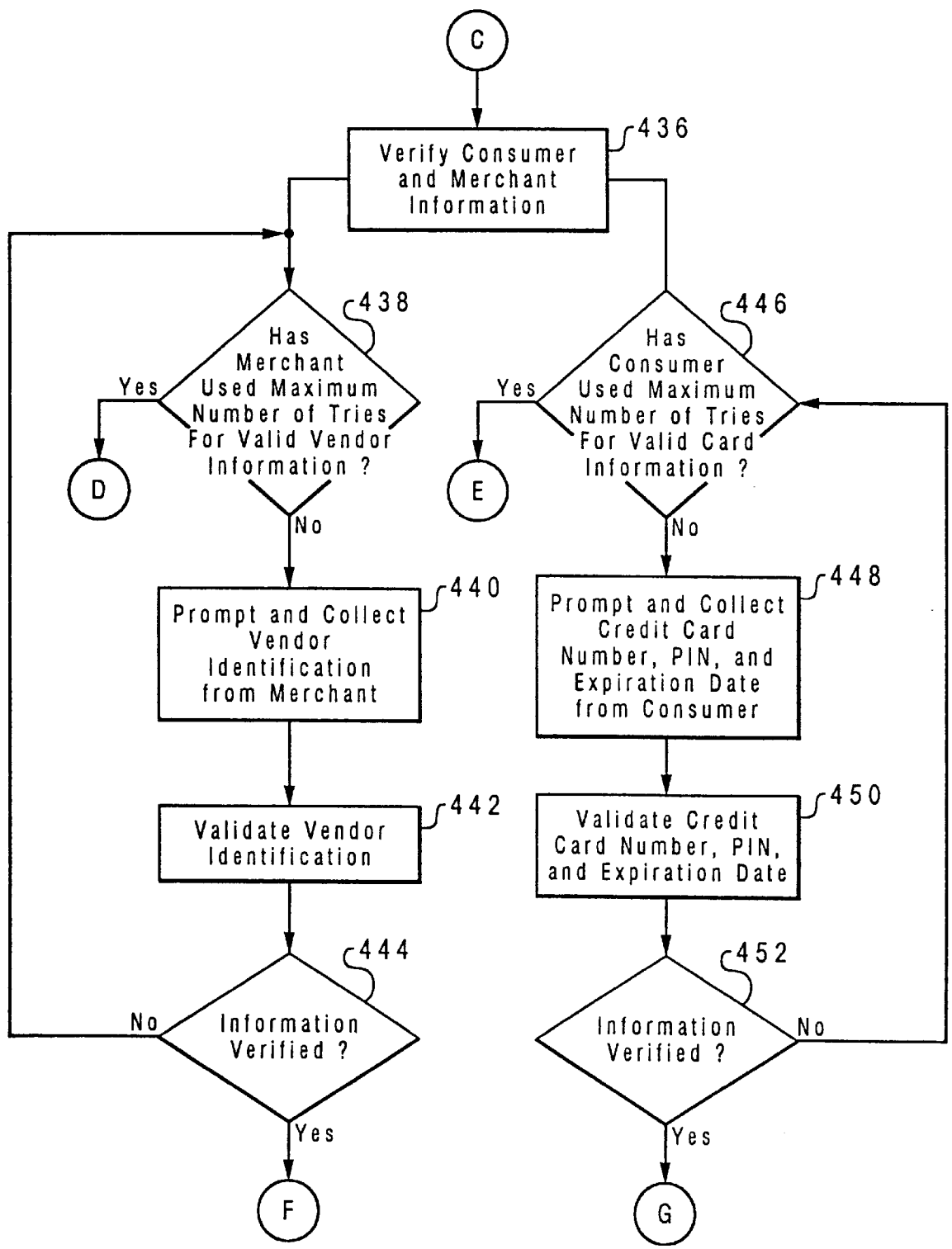
Figure 7E:
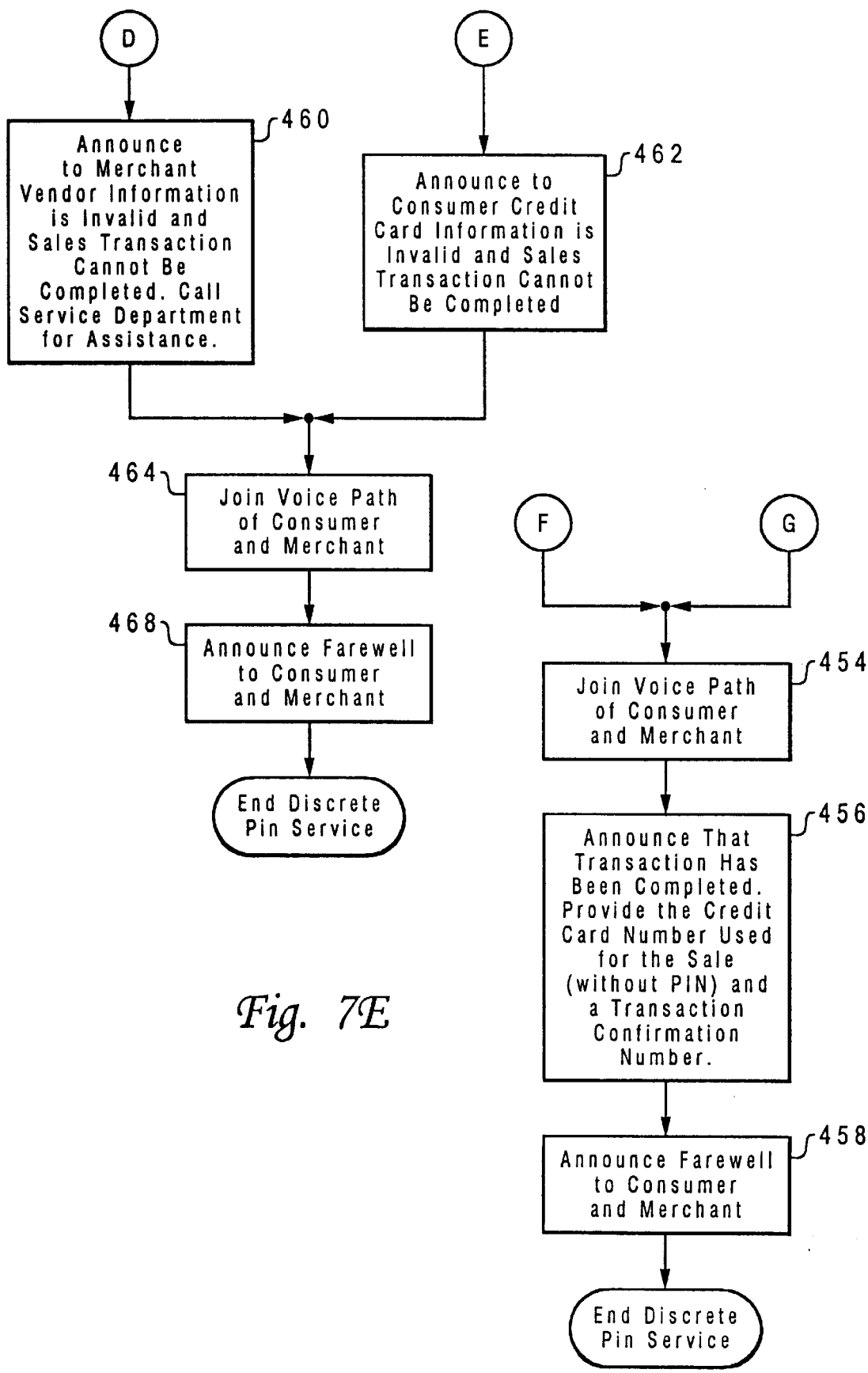

In FIG. 6F, secure pin service 302 sends a response to consumer 300 and merchant 304 that a mometary separation from the call will occur for the service to collect consumer and merchant information needed to complete the transaction. Such a message is for example: "Please stay on the line for customer/vendor verification." Turning to FIG. 6G, secure pin service 302 uses communications link 308 and sends a message requesting the vendor identification number from the merchant, such as, for example: "Please enter your vendor identification number followed by '#'". In response to merchant 304 entering its vendor identification number, another message is sent to merchant 304 indicating that a short delay will occur while transaction information is being verified such as, for example: "Please stay on the line while the transaction information is being verified." Music on hold may be sent to merchant 304 while the verification process occurs.

Consumer 300 is simultaneously prompted for customer verification information in FIG. 6H at the same time merchant verification information is requested from merchant 304 in FIG. 6G. More specifically, secure pin service 302 sends an automated message requesting a credit card number from consumer 300. This message may be, for example, the following: "Please enter your credit card number followed by '#'. In response to consumer 300 entering the credit card number, an automated response from secure pin service 302 requests customer 300's customer pin digits: "Please enter your pin digits followed by '#'". In response to the pin digits being entered, secure pin service 302 then sends a message requesting the card expiration date. The prompt may be, for example: "Please enter your expiration date followed by '#'". Consumer 300 enters the credit card expiration date and the secure pin service 302 notifies consumer 300 that a short delay will occur while the transaction is being verified with the notification being, such as, for example: "Please stay on the line while the transaction information is being verified." As with merchant 304, music on hold is employed while the verification process occurs. Again, the process in FIG. 6H occurs at the same time vendor verification occurs in FIG. 6G. Once the verification information is collected, all of the parties are reconnected to the call. At this time, in FIG. 6I, secure pin service 302 notifies consumer 300 and merchant 304 that the sales transaction has been completed. The credit card number without pin digits and a confirmation number is given to merchant 304 and consumer 300.

The secure pin service process illustrated in FIGS. 6A–6I may be enhanced to provide for the name and shipping/billing address of the consumer. In such an implementation, the secure pin service could obtain this information directly from the consumer or from the card validation node.

With reference to FIGS. 7A–7E, a flowchart of a secure pin service process is depicted in accordance with a preferred embodiment of the present invention. This process, in the depicted example, is executed by a data processing system, such as data processing system 200 in FIG. 4. The secure pin service process is initiated by the consumer calling and establishing a communications link with the secure pin service. This process begins by sending a greeting announcement to the consumer (step 400). Thereafter, the process prompts and collects the merchant phone number from the consumer and places the consumer on hold (step 402). The process then calls the merchant to establish a communications link (step 404). A determination is made as to whether the merchant answers the call (step 406). If the merchant does not answer the call, the process then informs the consumer that the call could not be completed to the merchant and disconnects the call with the consumer (step 408) with the secure pin service terminating thereafter. On the other hand, if the merchant answers the call from the secure pin service, the process then sends a greeting announcement to the merchant (step 410). The process then connects the consumer and the merchant (step 412) and announces to the consumer and the merchant that a "#" key must be entered to continue the service (step 414). Additionally, the process announces the amount of time a consumer and a merchant have to establish a sales transaction (step 416). Afterwards, the process starts a sales transaction timer (step 418). The process determines whether the timer has expired (step 420). If the timer has expired, the process then announces to the consumer and the merchant that the time to establish a sales transaction has expired (step 422) and announces farewell to the consumer and the merchant (step 424) with the secure pin service terminating thereafter. Additionally, this process may be enhanced to provide an announcement prior to the transaction timer expiring during the establishment of the sales transaction, notifying the consumer and merchant to conclude the negotiations for the transaction. If the negotiations cannot be concluded, the two parties can call the secure pin service again.

With reference again to step 420, if the timer has not expired, a determination is made by the process as to whether a "#" key has been entered, and if a "#" has not been entered, the process then returns to step 420. Otherwise, the process continues and prompts and collects a total sales amount from the consumer followed by a "#" key (step 428). The process then verifies the sales amount (step 430) and determines whether the sales amount has been verified (step 432). If the sales amount is not verified, the process then returns to step 428. Upon verifying the sales amount, the process then separates the voice path between the consumer and the merchant to form a voice path between the secure pin service and the consumer and another voice path between the secure pin service and the merchant (step 434). The process then verifies consumer and merchant information (step 436). The steps involved in verifying information for the consumer and for the merchant occur at the same time. Specifically, steps 438–444 and steps 446–452 occur at the same time. This verification is performed through the two voice paths.

In determining the merchant information, the process determines whether the merchant has used the maximum number of tries for validating vendor information (step 438). If the maximum number of tries has not occurred, the process prompts and collects from the merchant vendor identification information (step 440). The process then attempts to validate the vendor information (step 442) and determines whether the information is verified (step 444). If the information has not been verified, the process returns to step 438.

At the same time merchant information is verified, the process determines whether the consumer has used the maximum number of tries for entering valid credit card information (step 446). If the maximum number of tries has not occurred, the process then prompts and collects a credit card number, a PIN, and an expiration date from the consumer (step 448). The process then initiates a process to validate the credit card number, the PIN, and the expiration date. A determination is then made as to whether all of the information has been verified (step 452). If all of the information has not been verified, the process then returns to step 446 as described above.

If the information is verified in both steps 444 and 452, the process then continues by joining the voice path between the secure pin service and the consumer with the voice path of the merchant (step 454). The process then announces the transaction has been completed and provides the credit card number used for the sale without the PIN and a transaction confirmation number (step 456). The process then announces farewell to the consumer and the merchant (step 458) with the process terminating thereafter.

With reference again to step 438, if the maximum number of tries has occurred, the process then announces to the merchant that the vendor information is invalid and that the sale transaction cannot be completed (step 460). Additionally, at this time, the process also may tell the merchant to call the service department for assistance. With reference again to step 446, if the maximum number of tries has occurred, the process announces to the consumer that the credit card information provided by the consumer is invalid and that the sales transaction cannot be completed. From both steps 460 and 462, the process joins the voice path between the secure pin service and the consumer and the voice path between the secure pin service and the merchant (step 464) and announces farewell to the consumer and the merchant (step 468) with the process terminating thereafter.

Figure 8A:
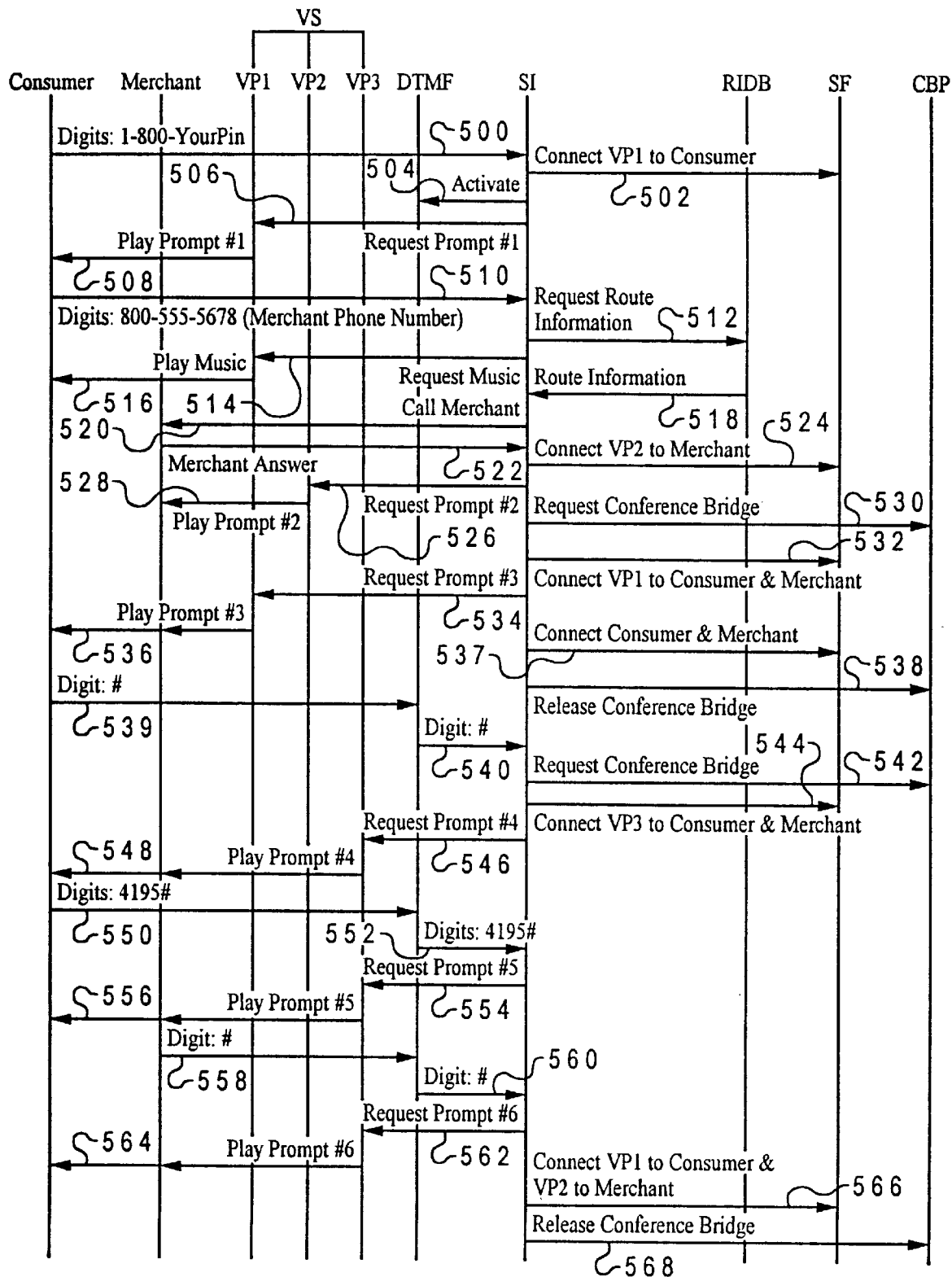
FIGS. 8A–8C are message flow diagrams illustrating a secure pin service in accordance with a preferred embodiment of the present invention.
Figure 8B:
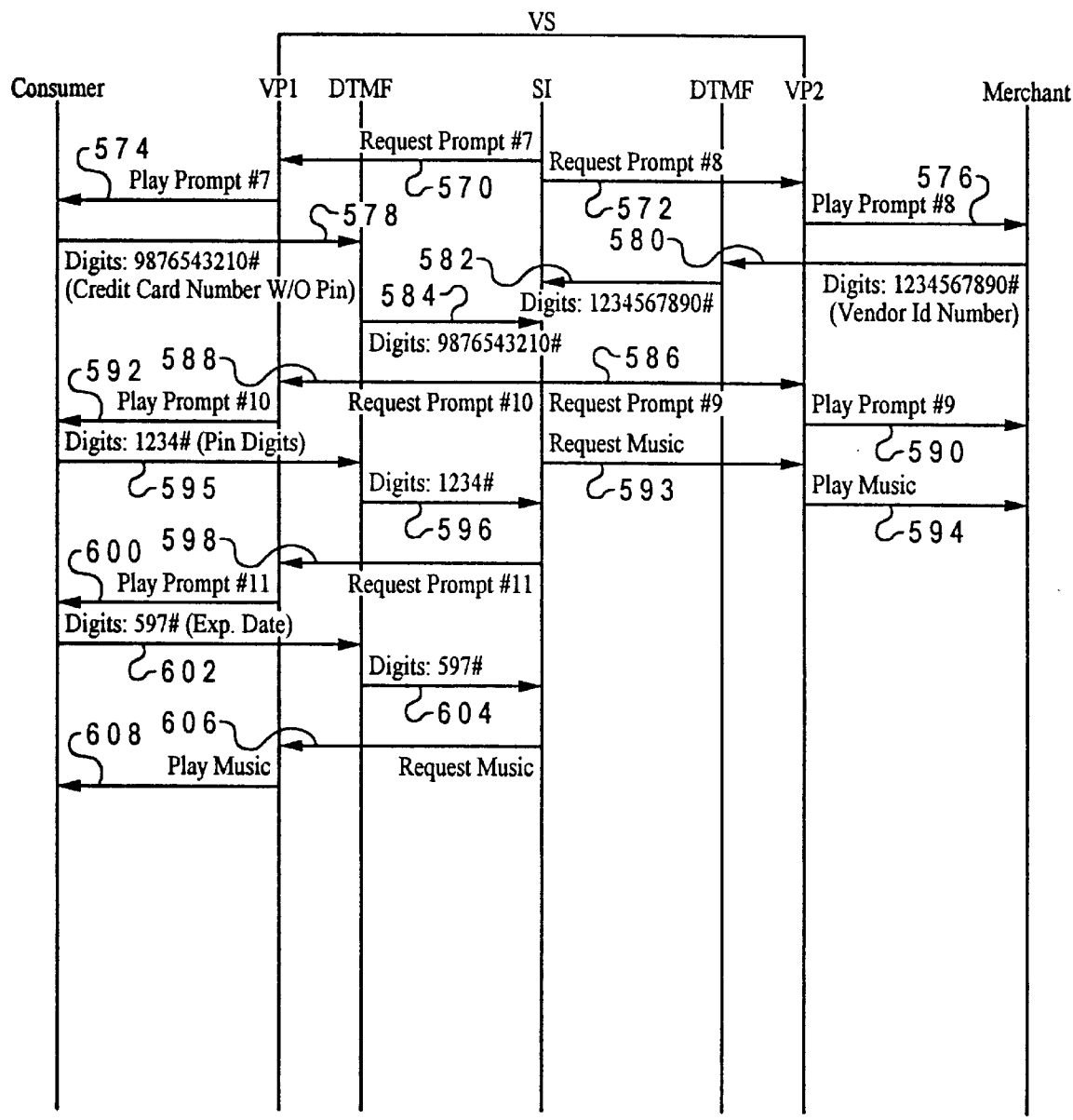
Figure 8C:
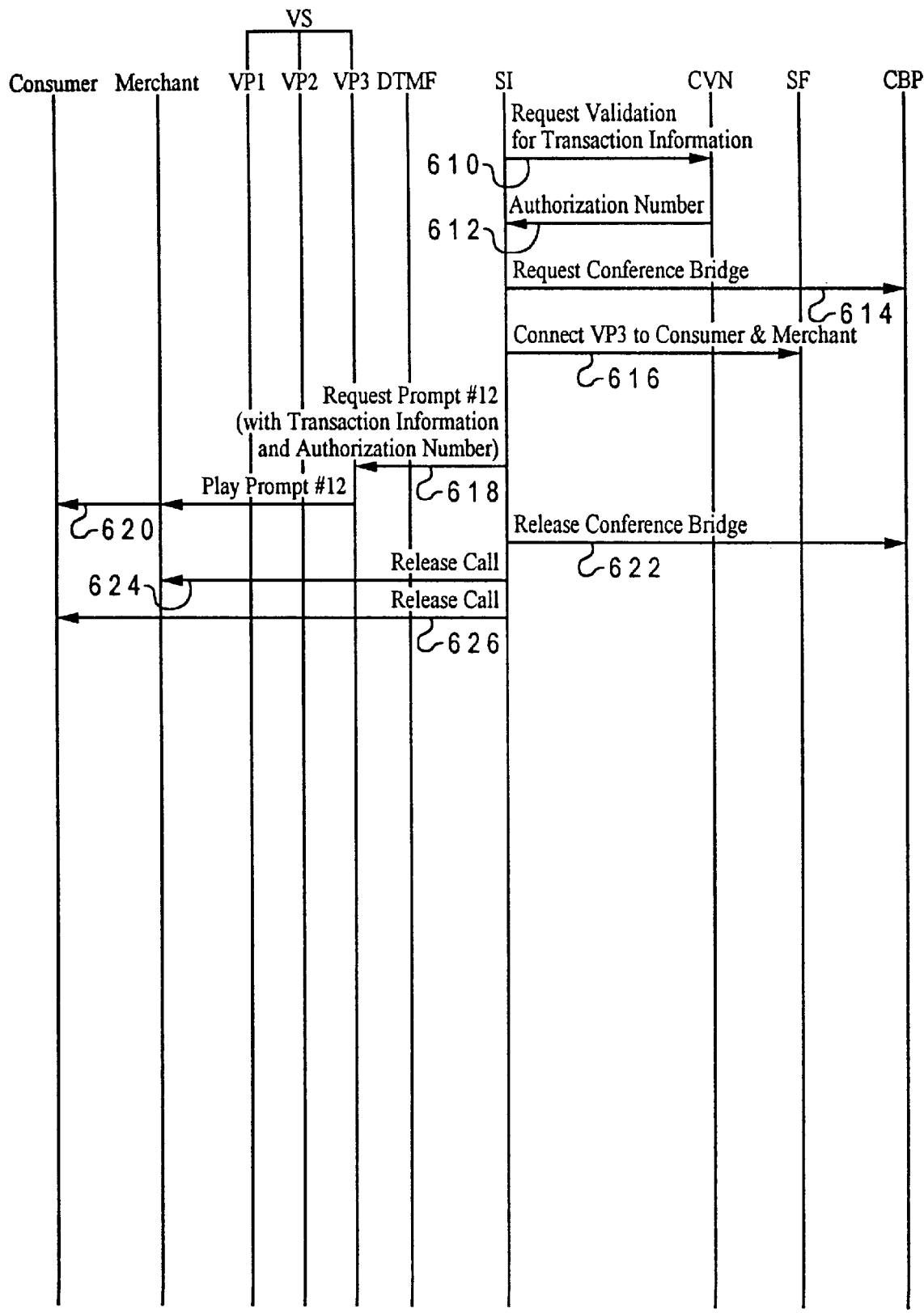

With reference now to FIGS. 8A–8C, a message flow diagram illustrating a secure pin service is depicted in accordance with a preferred embodiment of the present invention shown in FIG. 4. The switch intelligence (SI) within a data processing system receives a call from a consumer dialing a special number for the secure pin service (step 500). The SI then connects the consumer to voice port 1 (VP1) in the voice server (VS) through the switch fabric (SF) in the data processing system (step 502). The SI then activates the DTMF detector (DTMF) (step 504). Thereafter, the SI then requests a prompt 1 from VP1 (step 506). In response to the message from the SI, the VS plays prompt 1 through VP1 to the consumer (step 508). In the depicted example in step 508, prompt 1 requests a merchant phone number from the consumer.

Next, the merchant phone number is sent to the SI from the consumer (step 510). In response to receiving the merchant phone number, the SI requests route information from the routing information database (RIDB) using the merchant phone number received from the consumer (step 512). The SI also requests that the VS play music to the consumer (step 514). In response, the VS plays music to the consumer through VP1 (step 516). The RIDB returns route information to the SI (step 518). In response to receiving the route information, the SI initiates a call to the merchant (step 520). The SI receives an answer for the merchant (step 522). In response to the merchant answering the call, the SI connects the merchant to voice port 2 (VP2) using the SF (step 524). Thereafter, the SI requests prompt 2 from the VS to be sent to the merchant over VP2 (step 526). In response to this request, the VS plays prompt 2 to the merchant through VP2 (step 528). Prompt 2 indicates to the merchant that the merchant is being called to establish a transaction. The SI also requests a conference bridge from the conference bridge pool (CBP) (step 530). Thereafter, the SI uses the conference bridge to connect the consumer and the merchant and VP1 (step 532), and then requests prompt 3 from the VS (step 534). In response to the request for prompt 3, the VS plays prompt 3 to both the merchant and the consumer through VP1 (step 536). Prompt 3 is employed to inform the consumer and the merchant that the secure pin service will monitor for an indication that a sales transaction has been established. The indication used in the depicted example is the entering of a "#" from the consumer. The SI then instructs the SF to connect the consumer and the merchant (step 537). The SI then instructs the conference bridge pool to release the conference bridge (step 538).

A "#" is detected by DTMF (step 539) with the "#" being sent to the SI from the DTMF (step 540). In response to receiving a "#" from the consumer, the SI requests a conference bridge from the conference bridge pool (step 542). Then, the SI uses the conference bridge to connect voice port 3 (VP3), the consumer and the merchant by sending the request to the SF (step 544). Next, the SI requests prompt 4 from the VS (step 546). In response to the request from the SI, the VS plays prompt 4 to the consumer and the merchant (step 548). Prompt 4 requests the total amount of the sale from the consumer with the total ending in a "#". The consumer sends the total amount of the sale (4195#) to the DTMF by depressing the appropriate keys (step 550). In response to receiving the total amount of the sale from the consumer at the DTMF, the DTMF sends this information to the SI (step 552). In response to receiving the total amount of the sale, the SI requests prompt 5 from the VS to be played on VP3 (step 554). The VS plays prompt 5 to the consumer and the merchant through VP3. Prompt 5 basically requests that the merchant verify the total sales amount by entering a "#". This verification by the merchant is sent to the DTMF (step 558) with the verification being relayed to the SI from the DTME (step 560).

In response to receiving this verification, the SI requests prompt 6 to be sent by the VS over VP3 (step 562). In response in receiving this request, the VS plays prompt 6 to the consumer and the merchant through VP3 (step 564). Prompt 6 basically informs the consumer and the merchant that a momentary separation from the call between the consumer and the merchant will occur to obtain verification information needed to complete the sales transaction. Next, the SI sends a request to the SF to connect the consumer to VP1 and the merchant to VP2 (step 566). The SI then sends a request to the conference bridge pool to release the conference bridge (step 568).

In FIG. 8B, the messaging between the consumer and the secure pin service and between the merchant and the secure pin service takes place simultaneously in the depicted example. The messaging between the secure pin service and the consumer occurs a synchronously in comparison with the messaging between the secure pin service and the merchant in FIG. 8B. The SI sends a request to the VS to play prompt 7 over VP1 to the consumer (step 570). At the same time, a request is sent by the SI to the VS to play prompt 8 through VP2 (step 572). In response to receiving these requests, the VS plays prompt 7 to the consumer through VP1 (step 574) and plays prompt 8 to the merchant through VP2 (step 576). Prompt 7 requests the consumer's credit card number without a PIN from the consumer, while prompt 8 requests the vendor identification number from the merchant. Both prompts request that the numbers terminate with a "#".

In response to prompt 7, the consumer sends a credit card number (9876543210#) that is received by the DTMF (step 578). The merchant returns a vendor identification number (1234567890#) that is detected by the DTMF (step 580). The vendor identification is sent from the DTMF to the SI (step 582) with the credit card number also being sent to the SI from the DTMF (step 584). In response to receiving this information, the SI requests the VS to play prompt 9 over VP2 to the merchant (step 586) and requests prompt 10 to be played over VP1 to the consumer (step 588). In response to receiving requests from the SI, the VS plays prompt 9 over VP2 to the merchant (step 590) and plays prompt 10 over VP1 to the consumer (step 592). Prompt 9 informs the merchant to wait while the information is being verified. Prompt 10 request the consumer to enter a personal identification number (PIN) followed by a "#". The SI sends a request to the voice server to play music to the merchant using VP2 (step 593) and in response to the request, the voice server plays music through VP2 to the merchant (step 594). The consumer enters a PIN that is received by the DTMF (step 595). These digits are sent from the DTMF to the SI (step 596).

In response to receiving the PIN, the SI requests that the VS play prompt 11 over VP1 to the consumer (step 598). In response to the request, the VS plays prompt 11 to the consumer over VP1 (step 600). Prompt 11 requests an expiration date followed by a "#" from the consumer. The consumer enters an expiration date (597#) which is received by the DTMF (step 602). This expiration date is sent to the SI from the DTMF (step 604). Thereafter, the SI requests music to be sent by the VS to the consumer over VP1 (step 606). In response to this request, the VS plays music to the consumer using VP1 (step 608).

Next in FIG. 8C, the SI requests the card validation node (CVN) to validate transaction information (step 610). In response to the request from the SI, the CVN returns an authorization number to the SI (step 612). This authorization number is sent to validate transaction information. The SI requests a conference bridge from the CBP after receiving an authorization number (step 614). Thereafter, the SI sends a request to the SF to connect the consumer, the merchant and VP3 using the conference bridge (step 616). After connecting the consumer and the merchant, the SI sends a request to the VS to play prompt 12 over VP3 (step 618). In response to receiving this request, the VS plays prompt 12 over VP3 to the consumer and the merchant (step 620). Prompt 12 provides the consumer and the merchant with transaction information and an authorization number. Prompt 12 also announces a farewell to the consumer and the merchant. In no instance in the depicted example is a PIN provided to the merchant. Thereafter, the SI sends a request to the CPE to release the conference bridge (step 622) and then the call to the merchant is released (step 624) along with the call to the consumer being released (step 626).

Thus, the present invention provides a method and apparatus for securely facilitating financial transactions made over a communications system. In particular, the present invention provides a secure pin service that reduces the number of parties exposed to a PIN used to validate a credit card number. In addition, the processes of the present invention as described above may be enhanced to allow the consumer and merchant to verify the transactions without requiring on line negotiations. The depicted examples illustrate one manner in which errors may be handled, sending a message to the parties and disconnecting the call. Other error paths may be employed when a transaction is unsuccessful with the exact manner in which errors are handled being left to the particular implementation.

It is important to note that while the present invention has been described in the context of a communications system including processors for processing instructions to provide the functions described, the processes of the present invention are capable of being distributed in the form of a computer readable medium of instructions in a variety of forms that the present invention applies equally regardless of the particular type of signal bearing media actually used to carry out the distribution. Examples of computer readable media include: recordable-type media such as floppy disks and CD ROMs and transmission-type media such as digital and analog communications links.

The description of the preferred embodiment of the present invention has been presented for purposes of illustration and description, but is not intended to be exhaustive or limit the invention in the form disclosed. Many modifications and variations will be apparent to those of ordinary skill in the art. For example, although the examples in the present invention are directed towards two parties, a buyer and a seller, the apparatus and process may be expanded to include more than two parties. The embodiment was chosen and described in order to best explain the principles of the invention and the practical application to enable others of ordinary skill in the art to understand the invention for various embodiments with various modifications as are suited to the particular use contemplated.

What is claimed is:

1. A method in a communications system for facilitating a financial transaction between a first party and a second party, comprising:

receiving a request for the financial transaction acquiring information for the financial transaction from the two parties utilizing a common communications path including both the first and second parties and independent communications paths to each of the first and second parties; and verifying information acquired from the first and second parties to complete the financial transaction.

2. The method of claim 1, wherein the step of acquiring information for the financial transaction from the two parties utilizing a common communications path including both the first and second parties and independent communications paths to each of the first and second parties further comprises:

acquiring information from the first and second parties using the common communications path;

establishing a first voice path to the first party and a second voice path independent of the first voice path to the second party, wherein the first party is excluded from the second voice path and the second party is excluded from the first voice path;

acquiring and verifying information from the first party using the first voice path; and acquiring and verifying information from the second party using the second voice path.

3. The method of claim 1, further comprising:

announcing completion of the financial transaction in response to verification of the information acquired from the first party and the information acquired from the second party.

4. The method of claim 1, further comprising:

announcing a failure to complete the financial transaction in response to a failure to verify the information acquired from the first party.

5. The method of claim 1, wherein the step of acquiring information for the financial transaction from the two parties utilizing a common communications path including both the first and second parties and independent communications paths to each of the first and second parties further comprises:

acquiring a first item of information from the two parties utilizing a common communications path to both parties:

separating the common communications path into first and second communications paths to the first and second parties, respectively, wherein the first communications path excludes the second party and the second communications path excludes the first party;

acquiring a second item of information from the first party utilizing the first communications path;

acquiring a third item of information from the second party utilizing the second communication path; and after acquiring the second and third items of information, joining the first and second communications path into a common communications path to both parties.

6. The method of claim 1, wherein the step of acquiring information for the financial transaction from the two parties utilizing a common communications path including both the first and second parties and independent communications paths to each of the first and second parties further comprises:

receiving an indication that the financial transaction has been initiated;

prompting the parties to enter data for the financial transaction; and receiving data in response to prompting the parties.

7. The method of claim 6, wherein the step of prompting parties to enter data for the financial transaction comprises:

prompting the parties to enter and verify a sales amount for the financial transaction.

8. The method of claim 7, and wherein the step of prompting the parties to enter and verify a total amount for the financial transaction comprises:

prompting the first party to enter the total amount for the financial transaction; and prompting the second party to indicate that the total amount for the financial transaction is correct.

9. The method of claim 2, wherein the first party is a buyer and the second party is a seller.

10. The method of claim 9, wherein the step of acquiring and verifying information from the first party using the first voice path further comprises:

prompting the buyer to enter credit card information for a credit card; and verifying validity of the credit card using the credit card information.

11. The method of claim 10, wherein the credit card information includes a credit card number and an expiration date.

12. The method of claim 11, wherein the credit card information further includes a personal identification number.

13. The method of claim 9, wherein the step of acquiring and verifying information from the second party using the second voice path further comprises:

prompting the seller to enter vendor information about the seller; and verifying validity of the seller information.

14. The method of claim 9, wherein the buyer is a consumer.

15. The method of claim 9, wherein the seller is a merchant.

16. The method of claim 5, wherein the steps of separating the common communications path into first and second communications paths to the first and second parties, respectively, and of joining the first and second communications paths into a common communications path to both parties are performed within a switch within the communications system.

17. The method of claim 1, wherein the step of acquiring information for the financial transaction from the two parties utilizing a common communications path including both the first and second parties and independent communications paths to each of the first and second parties further includes:

awaiting a signal from parties indicating the financial transaction has been initiated.

18. A method in a communications system for facilitating a financial transaction within the communications system, the method comprising data processing system implemented steps of:

receiving a request for a financial transaction from a consumer;

initiating call to a merchant associated with the request;

establish a communications link involving the merchant and the consumer;

acquiring data identifying an amount for the financial transaction utilizing the communications link;

establishing a first voice path for the merchant and a second voice path for the consumer, wherein the first and second voice paths are independent, the merchant is excluded from the second voice path, and the consumer is excluded from the first voice path;

acquiring and verifying merchant information using the first voice path; and acquiring and verifying consumer information using the second voice path, wherein the financial transaction is securely completed.

19. The method of claim 18, wherein the step of initiating a call to the merchant comprises:

requesting a phone number for the merchant from the consumer; and calling the merchant using the phone number.

20. The method of claim 18, wherein the step of acquiring acquiring data identifying an amount for the financial transaction utilizing the communications link further comprises:

awaiting a signal from parties indicating the financial transaction has been initiated.

21. A communications system, comprising:

a telecommunications network;

a data processing system coupled to the telecommunications network processing transactions between a buyer and a seller, including:

reception means for receiving a request for the financial transaction;

acquisition means for acquiring data for the financial transaction from the two parties utilizing a common communications path including the buyer and the seller and first and second separate communications paths to the buyer and the seller, respectively;

first verification means for verifying buyer information acquired utilizing the first voice path; and second verification means for verifying seller information acquired utilizing the second voice path.

22. The communications system of claim 21, wherein the data processing system further includes:

announcement means for announcing completion of the financial transaction in response to verification of the buyer information and the seller information.

23. The communications system of claim 21, wherein the data processing system further includes:

announcement means for announcing a failure to complete the financial transaction in response to a failure to verify the buyer information.

24. The communications system of claim 21, wherein the data processing system further includes:

announcement means for announcing a failure to complete the financial transaction in response to a failure to verify the seller information.

25. The communications system of claim 21, wherein the acquisition means comprises:

first reception means for receiving an indication that the financial transaction has been established;

prompting means for prompting the parties to enter data for the financial transaction; and second reception means for receiving the data in response to prompting the parties.

26. The communications system of claim 25, wherein the prompting means comprises:

means for prompting the parties to enter and verify a sales amount for the financial transaction.

27. The communications system of claim 26, wherein means for prompting the parties to enter and verify a total amount for the financial transaction comprises:

first means for prompting the buyer to enter the total amount for the financial transaction; and second means for prompting the seller to indicate that the total amount for the financial transaction is correct.

28. The communications system of claim 21, wherein first verification means comprises:

prompting means for prompting the user to enter credit card information for a credit card; and means for verifying validity of the credit card using the credit card information.

29. The communications system of claim 28, wherein the credit card information includes a credit card number and an expiration date.

30. The communications system of claim 29, wherein the credit card information further includes a personal identification number.

31. The communications system of claim 21, wherein the second verification means comprises:

prompting means for prompting the seller to enter vendor information about the seller; and means for verifying validity the seller information.

32. The communications system of claim 21, wherein the buyer is a consumer.

33. The communications system of claim 21, wherein the seller is a merchant.

34. The communications system of claim 21, wherein the data processing system is a switch within the communications system.

35. The communications system of claim 21, wherein the data processing system is a computer coupled to a switch within the communications system.

36. A communications system, comprising:

a network providing a plurality of communications paths;

a plurality of communications units connected to the network; and a control system establishing, in response to receiving a request for a transaction, a common communications path between a data process system coupled to the network and first and second communications units connected to the network, wherein initial transaction information is transferred over the common communications path, wherein the control system, following transfer of the initial transaction information, separates the common communications paths into a first communications path to the first communications unit and a second communications path to the second communications unit, wherein the first and second communications paths are separate and mutually exclusive, and wherein first and second items of transaction information are transferred over the first and second communications paths, respectively.

37. A switch, comprising:

a validation database including buyer information and seller information;

a routing information database;

a voice server; and a switch intelligence having a plurality of modes of operation including:

a first mode of operation in which the switch intelligence receives a request for the financial transaction;

a second mode of operation, responsive to receiving the request, in which the switch intelligence, using the routing information database, establishes a call including the buyer and the seller, wherein the financial transaction is initiated between the two parties and data is acquired from the two parties through the call;

a third mode of operation, responsive to detecting initiation of the financial transaction, in which the switch intelligence acquires data for the financial transaction from the two parties utilizing separate, mutually exclusive voice links to each respective party, the separate, mutually exclusive voice links including a first voice path for the buyer and a second voice path for the seller, the switch intelligence using the voice server to provide the first and second voice paths; and a fifth mode of operation, responsive to establishing the first and second voice paths and acquiring data for the financial transaction from the two parties, in which the switch intelligence verifies buyer information acquired using the first voice path and verifies seller information acquired using the second voice path using the validation database.

38. A computer program product for facilitating a financial transaction between a seller and a buyer, comprising:

a computer usable medium;

first instructions for receiving a request for the financial transaction;

second instructions for acquiring data for the financial transaction from the two parties utilizing a common communications link including both parties and separate and mutually exclusive communications links to each of the two parties, the separate communications links including a first voice path for the buyer and a second voice path for the seller;

third instructions for verifying buyer information acquired using the first voice path; and fourth instructions for verifying seller information acquired using the second voice path, wherein the instructions are embodied within the computer usable medium.

* * * * *